(12) United States Patent
Wenig

(10) Patent No.: US 10,146,860 B2
(45) Date of Patent: Dec. 4, 2018

(54) BIOMETRIC DATA BASED NOTIFICATION SYSTEM

(71) Applicant: eBay Inc., San Jose, CA (US)

(72) Inventor: Devin Wenig, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/673,157

(22) Filed: Aug. 9, 2017

(65) Prior Publication Data

US 2017/0352088 A1 Dec. 7, 2017

Related U.S. Application Data

(63) Continuation of application No. 14/559,612, filed on Dec. 3, 2014.

(60) Provisional application No. 62/035,355, filed on Aug. 8, 2014.

(51) Int. Cl.
| | | |
|---|---|---|
| *G06Q 30/00* | (2012.01) | |
| *G06F 17/30* | (2006.01) | |
| *G06Q 30/06* | (2012.01) | |
| *H04N 21/466* | (2011.01) | |
| *G06Q 30/02* | (2012.01) | |

(52) U.S. Cl.
CPC ........ *G06F 17/30702* (2013.01); *G06F 17/30* (2013.01); *G06Q 30/0631* (2013.01); *H04N 21/4667* (2013.01); *G06Q 30/0271* (2013.01)

(58) Field of Classification Search
None
See application file for complete search history.

(56) References Cited

U.S. PATENT DOCUMENTS

| | | | |
|---|---|---|---|
| 8,456,293 B1* | 6/2013 | Trundle | G08B 21/0423 340/517 |
| 9,406,091 B1 | 8/2016 | Lopez et al. | |
| 2008/0235216 A1* | 9/2008 | Ruttenberg | G06F 17/30867 |
| 2011/0137877 A1* | 6/2011 | Strassner | G06Q 10/00 707/694 |
| 2012/0059706 A1* | 3/2012 | Goenka | G06F 17/30569 705/14.41 |
| 2013/0047176 A1* | 2/2013 | Charania | G06F 17/30846 725/14 |

(Continued)

OTHER PUBLICATIONS

Pons, Alexander, Biometric Marketing: Targeting the Online Consumer, Aug. 2006, Communications of the ACM, vol. 49, Issue 8, pp. 60-66 (Year: 2006).*

(Continued)

*Primary Examiner* — William J Allen
*Assistant Examiner* — Timothy J Kang
(74) *Attorney, Agent, or Firm* — Schwegman Lundberg & Woessner, P.A.

(57) ABSTRACT

In various example embodiments, a system and method for providing notifications based on biometric data are presented. Biometric data from multiple biometric sensors is aggregated and stored. Inferential analysis is performed on the biometric data to characterize an associated user. A user characteristic is correlated to one or more consumer characteristics in a consumer profile and output information is determined based on the consumer profile. A notification that includes the output information is transmitted to a computing device of the user.

20 Claims, 16 Drawing Sheets

(56) References Cited

U.S. PATENT DOCUMENTS

| | | | | |
|---|---|---|---|---|
| 2013/0317828 | A1* | 11/2013 | Greenzeiger | G06F 17/30 704/275 |
| 2014/0130099 | A1* | 5/2014 | Kunisetty | H04N 21/4667 725/50 |
| 2014/0279722 | A1* | 9/2014 | Singh | G06F 17/30702 706/11 |
| 2014/0280138 | A1* | 9/2014 | Li | G06Q 30/02 707/737 |
| 2015/0371256 | A1* | 12/2015 | Shah | G06Q 30/0242 705/14.41 |
| 2016/0042432 | A1 | 2/2016 | Wenig | |

OTHER PUBLICATIONS

Advisory Action received for U.S. Appl. No. 14/559,612, dated Jul. 23, 2018, 3 pages.
Response to Final Office Action filed on Jul. 10, 2018, for U.S. Appl. No. 14/559,612, dated May 15, 2018, 23 pages.
Final Office Action received for U.S. Appl. No. 14/559,612, dated May 15, 2018, 29 pages.
First action Interview—office action Summary received for U.S. Appl. No. 14/559,612, dated Jan. 10, 2018, 9 pages.
Preliminary Amendment filed for U.S. Appl. No. 14/559,612, dated Apr. 18, 2017, 14 pages.
First Action Interview—Pre-interview Communication received for U.S. Appl. No. 14/559,612, dated Oct. 19, 2017, 6 pages.
Applicant Initiated Interview Summary received for U.S. Appl. No. 14/559,612, dated Jun. 23, 2017, 2 pages.
Response to First Action Interview—Pre-interview Communication filed on Nov. 20, 2017 for U.S. Appl. No. 14/559,612, dated Oct. 19, 2017, 3 pages.
Applicant Initiated Interview Summary received for U.S. Appl. No. 14/559,612, dated Mar. 2, 2018, 3 pages.
Response to First Action Interview—Office Action Summary filed on Mar. 9, 2018, for U.S. Appl. No. 14/559,612, dated Jan. 10, 2018, 17 pages.
"U.S. Appl. No. 14/559,612, Non Final Office Action dated Sep. 28, 2018", 12 pgs.
Lane, Nicholas, "A Survey of Mobile Phone Sensing", Communications Magazine, IEEE vol. 48, No. 9, Retrieved from the Internet: URL: http: ieeexplore.ieee.org xpl login.jsp?tp=andarnumber=5560598andurl=http%3A%2F% 2Fieeexplore.ieee.org2Fiel5%2F35% 2F5560574%2F05560598.pdf%3Farnumber%3D5560598, (Sep. 2010), pp. 140-150.

\* cited by examiner

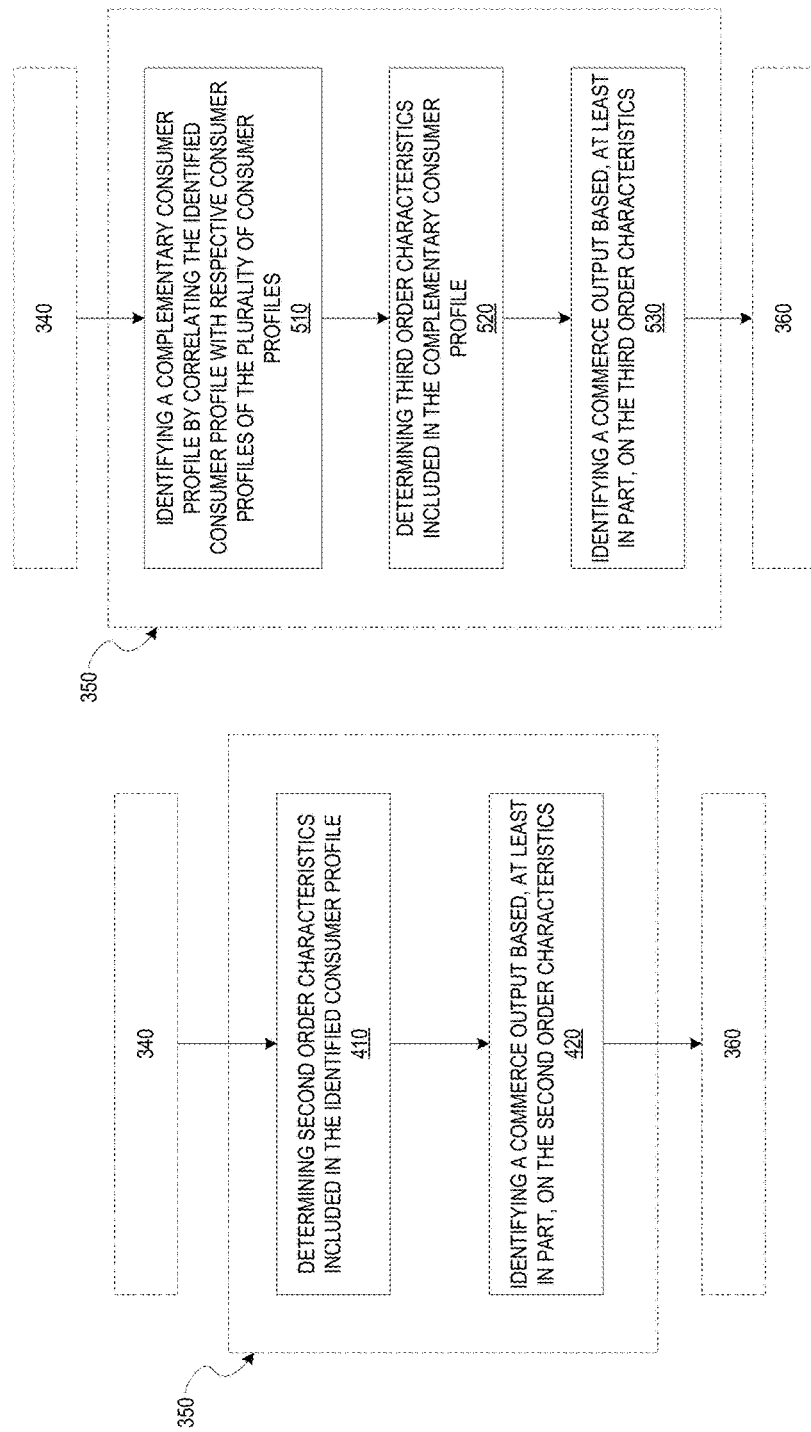

BIOMETRIC DATA BASED NOTIFICATION SYSTEM

CLAIM OF PRIORITY

This application claims the benefit of priority to U.S. patent application Ser. No. 14/559,612, filed on Dec. 3, 2014, which claims the benefit of U.S. Provisional Patent Application Ser. No. 62/035,355, filed on Aug. 8, 2014, both which are incorporated by reference herein in their entirety.

TECHNICAL FIELD

Embodiments of the present disclosure relate generally to processing of data, and more particularly, but not by way of limitation, to non-commerce data for commerce analytics. Embodiments of the present disclosure relate generally to a generation and transmission of notifications, and more particularly, but not by way of limitation, to a generation and transmission of notifications based on biometric data.

BACKGROUND

In recent years, mobile devices, wearable devices, smart devices, and the like have pervaded nearly every aspect of modern life. In addition, sensors to monitor everything, from the moisture level of houseplants to the dribbling of a basketball, are increasingly incorporated into such devices. These trends have provided a vast amount of rich, constantly updated data about consumers. Traditionally, commercial analysis has been based on commerce data and has typically been confined to identifying products and services directly correlated to such data.

BRIEF DESCRIPTION OF THE DRAWINGS

Various ones of the appended drawings merely illustrate example embodiments of the present disclosure and cannot be considered as limiting its scope.

FIGS. 4 and 5 are flow diagrams illustrating further example operations of the method of FIG. 3 according to some example embodiments.

Figure 1:
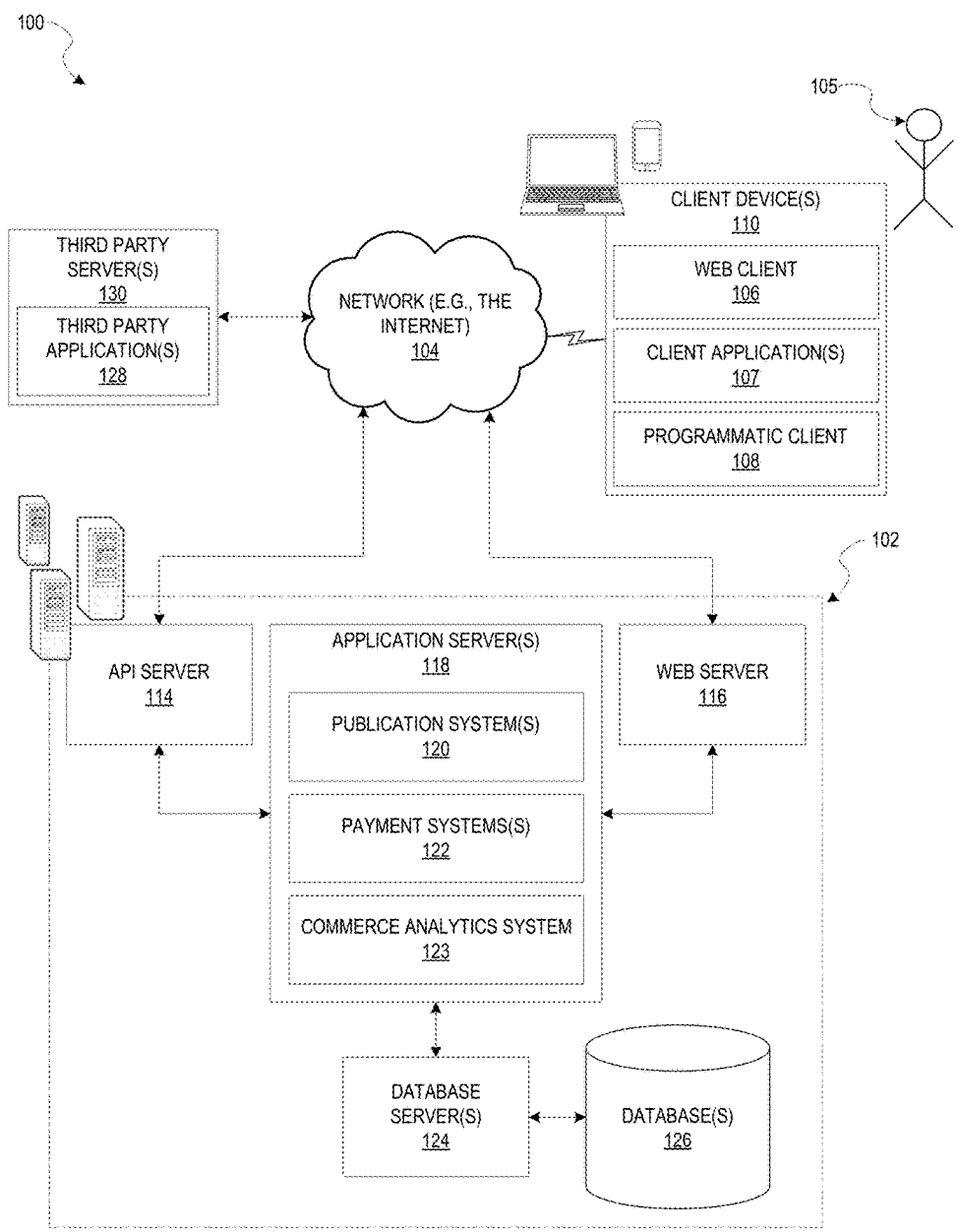
FIG. 1 is a block diagram illustrating a networked system according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

At a high level, a vast and rich dataset associated with a user (e.g., a consumer user of an e-commerce platform such as EBAY®) is available and becoming more extensive as new devices are released into the market. The dataset includes diverse and dynamic attribute data including data from mobile devices, smart devices, smart homes, social network services, user profiles, browsing histories, purchase histories, and so forth. Commerce outputs may be derived based not only on direct relationships with the attribute data, but on second order relationships, and other higher order relationships, determined by characterizing and profiling the user with characteristics inferred from the attribute data.

In various example embodiments, attribute data associated with the user may be received from various attribute sources (e.g., data from various sensors of a user device). User characteristics may be inferred based on an analysis of at least a portion of the attribute data. For example, a current location of the user may be inferred from location data received from a user device. Multiple consumer profiles including consumer characteristics may be accessed. For instance, a particular consumer profile may be associated with a person living in a metropolitan area and include consumer characteristics pertaining to such a person. A consumer profile from among the multiple consumer profiles may be identified by correlating the inferred user characteristics with respective consumer characteristics of the plurality of consumer profiles. In an example embodiment, a similarity between the inferred user characteristics and the consumer characteristics included in respective consumer profile may be used as a basis to identify a consumer profile. A commerce output (e.g., products, services, activities) may be identified based, at least in part, on the identified consumer profile. For example, the consumer characteristics or consumer profiles may be associated with various commerce outputs. A particular commerce output may be identified from among commerce outputs associated with the identified consumer profile. The identified commerce output may be recommended to the user. For instance, the commerce output may be a particular product listed on an e-commerce platform and the product may be recommended to the user via an advertisement on a mobile device of the user.

With reference to FIG. 1, an example embodiment of a high-level client-server-based network architecture 100 is shown. A networked system 102, in the example forms of a network-based publication, marketplace or payment system, provides server-side functionality via a network 104 (e.g., the Internet or wide area network (WAN)) to one or more client devices 110. FIG. 1 illustrates, for example, a web client 106 (e.g., a browser, such as the INTERNET EXPLORER® browser developed by MICROSOFT® Corporation of Redmond, Washington State), client applications 107, and a programmatic client 108 executing on the client devices 110. The client devices 110 may include the web client 106, the client applications 107, and the programmatic client 108 alone, together, or in any combination. Although FIG. 1 shows one of the client devices 110, multiple device machines may be included in the network architecture 100.

The client devices 110 may comprise a computing device that includes display and communication capabilities that provide access to the networked system 102 via the network 104. The client devices 110 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. In further example embodiments, the client devices 110 may comprise one or more of a touch screen, accelerometer, gyroscope, biometric sensor, camera, microphone, global positioning system (GPS) device, and the like. The client devices 110 may communicate with the network 104 via a wired or wireless connection. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Each client device 110 hosts multiple applications (also referred to as "apps"), such as a web browser, book reader (operable to read e-books), media applications (operable to present various media forms including audio and video), messaging application, electronic mail (email) application, an e-commerce site application (also referred to as a marketplace application), and so on. The client applications 107 may include various components operable to present information to the user and communicate with networked system 102. In some embodiments, if the e-commerce site application is included in a given one of the client devices 110, then this application may be configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in a given one of the client devices 110, the given one of the client devices 110 may use its web browser to access the e-commerce site (or a variant thereof) hosted on the networked system 102.

Users 105 may be a person, a machine, or other means of interacting with the client devices 110. In some example embodiments, the user 105 may not be part of the network architecture 100, but may interact with the network architecture 100 via the client devices 110 or another means. For instance, the users 105 may interact with client devices 110 that may receive input information from (e.g., using touch screen input or alphanumeric input) and present information to (e.g., using graphical presentation on a device display) the users 105. In this instance, the users 105 may, for example, provide input information to one or more of client devices 110 that may be communicated to the networked system 102 via the network 104. The networked system 102 may, in response to the received input information, communicate information to the client device 110 via the network 104 to be presented to the users 105. In this way, the users 105 may interact with the networked system 102 using one or more of client devices 110.

An application program interface (API) server 114 and a web server 116 are coupled to, and provide programmatic and web interfaces respectively to, one or more application servers 118. The application servers 118 may host one or more publication systems 120 and payment systems 122, each of which may comprise one or more modules or applications and each of which may be embodied as hardware, software, firmware, or any combination thereof. The application servers 118 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 120. The databases 126 may also store digital goods information in accordance with example embodiments.

The publication systems 120 may provide a number of publication functions and services to users 105 that access the networked system 102. The payment systems 122 may likewise provide a number of functions to perform or facilitate payments and transactions. While the publication systems 120 and payment systems 122 are shown in FIG. 1 to both form part of the networked system 102, it will be appreciated that, in alternative embodiments, each system 120 and 122 may form part of a payment service that is separate and distinct from the networked system 102. In some example embodiments, the payment systems 122 may form part of the publication systems 120.

The commerce analytics system 123 may provide functionality to infer characteristics corresponding to user 105 based on a variety of signals and information, identify a consumer profile associated with the user 105, and recommend a commerce output to the user 105 based on the consumer profile. In some example embodiments, the commerce analytics system 123 may communicate with the publication systems 120 (e.g., retrieving listings) and payment systems 122 (e.g., purchasing a listing). In an alternative embodiment, the commerce analytics system 123 may be a part of the publication systems 120. In some example embodiments, the commerce analytics system 123 or at least part of the commerce analytics system 123 may be part of the client applications 107. The commerce analytics system 123 will be discussed further in connection with FIG. 2.

Further, while the client-server-based network architecture 100 shown in FIG. 1 employs a client-server architecture, embodiments are not limited to such an architecture, and may equally well find application in a distributed, or peer-to-peer, architecture system, for example. The various publication and payment systems 120 and 122 may also be implemented as standalone software programs, which do not necessarily have networking capabilities.

The web client 106 accesses the various publication and payment systems 120 and 122 via the web interface supported by the web server 116. Similarly, the programmatic client 108 and client applications 107 access the various services and functions provided by the publication and payment systems 120 and 122 via the programmatic interface provided by the API server 114. The programmatic client 108 may, for example, be a seller application (e.g., the Turbo Lister application developed by EBAY® Inc., of San Jose, Calif.) to enable sellers to author and manage listings on the networked system 102 in an off-line manner, and to perform batch-mode communications between the programmatic client 108 and the networked system 102.

Additionally, third party applications 128, executing on third party servers 130, is shown as having programmatic access to the networked system 102 via the programmatic interface provided by the API server 114. For example, the third party application 128, using information retrieved from the networked system 102, may support one or more features or functions on a website hosted by the third party. The third party website may, for example, provide one or more promotional, marketplace, or payment functions that are supported by the relevant applications of the networked system 102.

Figure 2:
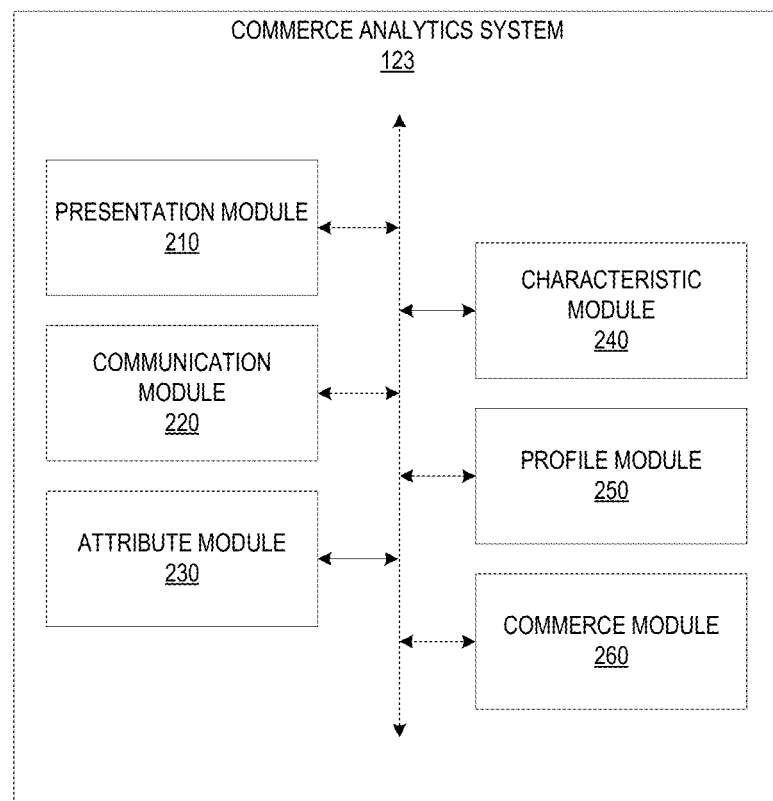
FIG. 2 is a block diagram illustrating an example embodiment of a commerce analytics system according to some example embodiments.

FIG. 2 is a block diagram of the commerce analytics system 123, which operates to provide, identify and recommend commerce outputs. The commerce analytics system 123 includes a presentation module 210, a communication module 220, an attribute module 230, a characteristic module 240, a profile module 250, and a commerce module 260. All, or some, of the modules 210-260 may communicate with each other, for example, via a network coupling, shared memory, and the like. It will be appreciated that each module of modules 210-260 may be implemented as a single module, combined into other modules, or further subdivided into multiple modules. Other modules not pertinent to example embodiments may also be included, but are not shown.

The presentation module 210 provides various presentation and user interface functionality operable to interactively present, or cause presentation, and receive information from the user. For example, the presentation module 210 may recommend or cause recommendation of the commerce output to the user 105 (e.g., an advertisement presented to the user on a mobile device). The presentation module 210 further presents or causes presentation of information (e.g., visually displaying information on a screen, acoustic output, haptic feedback). The user may provide input to interact with the user interface in many possible manners, such as alphanumeric input, cursor input, tactile input, or other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that the term "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with the networked system 102, the client device 110, and the third party servers 130. In various example embodiments, the network communication may operate over wired or wireless modalities. Web services are intended to include retrieving information from the third party servers 130, the database(s) 126, and the application servers 140. In some implementations, information retrieved by the communication module 220 comprises data associated with the user (e.g., user profile information from an online account, social network service data associated with the user), data associated with one or more items listed on an e-commerce website (e.g., images of the item, reviews of the item, item price), or other data to facilitate the functionality described herein.

The attribute module 230 may receive, access, or retrieve a wide variety of attribute data from many different attribute sources. For example, the attribute module 230 may receive, retrieve, or access the attribute data from user devices or machines (e.g., the client device 110), social network services, the third party servers 130, the publication systems 120, the payment systems 122, other applications servers, or other attribute sources. The attribute data, as used herein, is intended to include raw data such as sensor data, profile data, social network content, and so on.

In some example embodiments, the attribute module 230 extracts the attribute data from various sources. For instance, a payment history log of the user may include a tremendous amount of extraneous data. In this instance, the attribute module 230 extracts purchase information such as item purchased, time, purchase price, seller, location, brand, and so forth from the payment history log of the user.

In further example embodiments, the attribute module 230 performs various functions to prepare or condition the attribute data for analysis. For instance, the attribute module 230 standardizes the attribute data to facilitate analysis of the attribute data (e.g., determine a normal form for the data to allow for comparison and other mathematical analysis). The attribute module 230 may perform many other functions to prepare the attribute data for analysis.

In various example embodiments, the attribute module 230 stores the attribute data in association with the user for subsequent analysis. In some implementations, the attribute module 230 stores the attribute data in the database 126. The attribute data may be stored in conjunction with a user identifier such that the attribute module 230 may subsequently use the user identifier to access the attribute data corresponding to a particular user. In other implementations, the attribute module 230 accesses the stored attribute data using other schemes. For instance, the attribute module 230 may access a portion of the attribute data associated with a time, an item, a user, a type of user, a particular attribute source, and so forth. In this way, the attribute module 230 may access a portion of attribute data according to various parameters from among a large quantity of the attribute data to access, identify, or find pertinent and relevant data.

The characteristic module 240 may infer a user characteristic or multiple user characteristics corresponding to the user 105 based on an analysis of at least a portion of the attribute data. Many schemes and techniques may be employed to infer the characteristic from the attribute data. For example, a particular user characteristic may be a work location of the user 105. The attribute data may include a plurality of locations (e.g., as determined by a GPS component of a user device used by the user 105) that include time stamps. The work location of the user 105 may be inferred based on the consistency and timing of the locations included in the attribute data (e.g., during normal working hours, the user 105 is typically at a particular office building). Many different portions of attribute data and combinations of portions of attribute data may be analyzed to infer a wide variety of characteristics.

In various example embodiments, characteristics (e.g., the user characteristics), as used herein, are intended to include traits, qualities, actions, activities, attitudes, habits, behaviors, and the like pertaining to a person or people. Inasmuch as the attribute data may not necessarily pertain to a person (e.g., raw data such as coordinates of a particular location), a characteristic (e.g., current location of the user, disliking spicy food, having young children, being a Star Trek fanatic) may be distinct from the attribute data.

The profile module 250 may access a plurality of consumer profiles and identify a consumer profile from among the plurality of consumer profiles by correlating the identified characteristic with respective consumer characteristic of the plurality of consumer profiles. The plurality of consumer profiles may be predefined, dynamically generated, or a combination of predefined and dynamically generated. For example, the plurality of consumer profiles may be automatically generated by analyzing various attribute data in conjunction with control profiles (e.g., predefined consumer profiles).

The commerce module 260 may identify a commerce output based, at least in part, on the identified consumer profile. The commerce output is intended to include products, services, activities, and the like. For example, the commerce output may be a particular item the user 105 may be interested in or an activity that the user 105 may enjoy. The commerce module 260 may identify the commerce output or outputs using a wide variety of data from various sources. For instance, the commerce module 260 may identify item listings on an e-commerce website based on the identified consumer profiles. In this instance, the identified consumer profiles may include particular consumer characteristics. The commerce module 260 may analyze the particular consumer characteristics included in the identified consumer profile along with item listing information (e.g., item location, price, brand) to determine product listings the user 105 may be interested in. The commerce module 260 may identified many other commerce outputs that include many other products and services.

Figure 3:
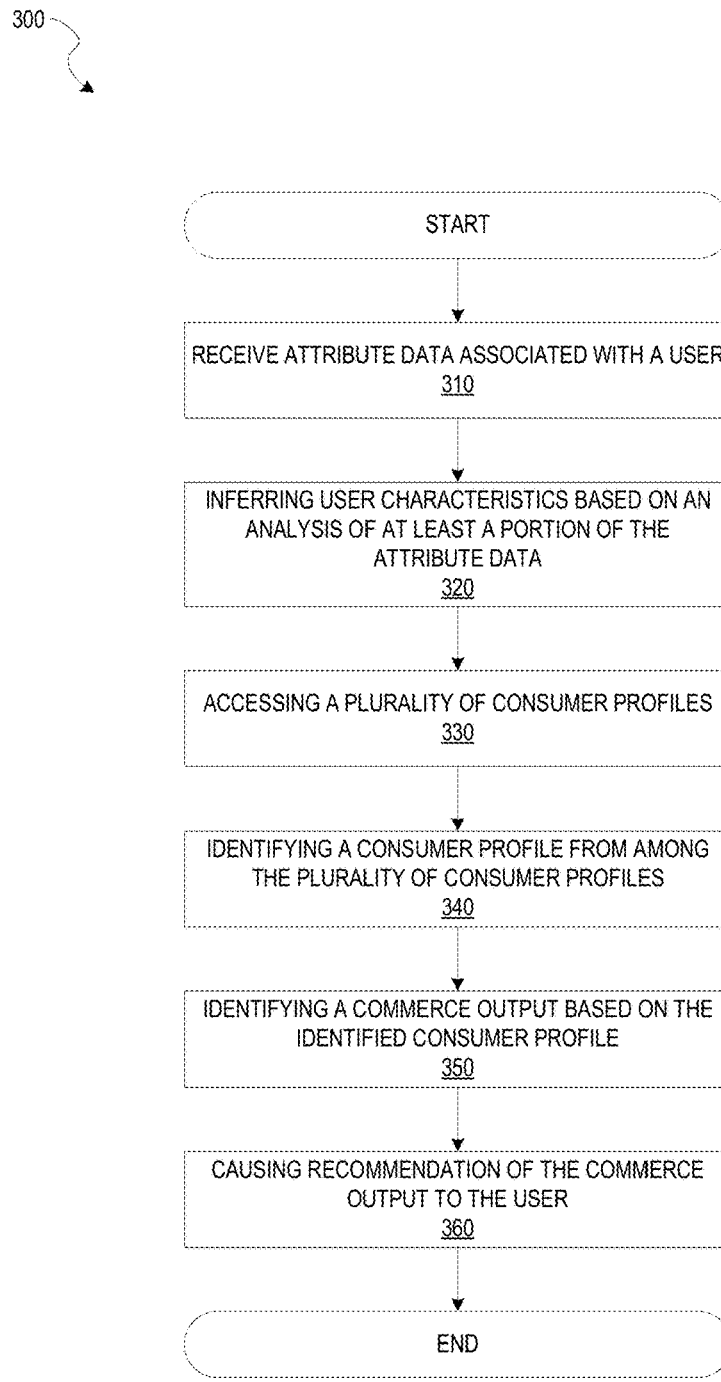
FIG. 3 is a flow diagram illustrating an example method for determining a commerce output according to some example embodiments.

FIG. 3 is a flow diagram illustrating an example method 300 for identifying and recommending the commerce output to the user (e.g., user 105), according to example embodiments. The operations of the method 300 may be performed by components of the commerce analytics system 123. At operation 310, the attribute module 230 may receive the attribute data associated with the user from the plurality of attribute sources. In various example embodiments, at least a portion of the attribute data may include real-time data or near real-time data. The term "real-time data," as used herein, is intended to include data associated with an event currently happening. For example, the real-time data may include user input data or sensor data communicated to the attribute module 230 after a delay interval (e.g., due to transmission delay or other delays such as being temporarily stored at an intermediate device) between capturing the data and the attribute module 230 receiving the data.

As will be discussed in connection with FIGS. 6 and 7, the attribute data may be received from a broad spectrum of attribute sources (e.g., devices, sensors, servers, databases, and other sources). Additionally, the attribute module 230 may receive the attribute data via many pathways resulting from an assortment of configurations of the attribute sources. In an example embodiment, the attribute module 230 may receive the attribute data directly from the attribute sources. In other example embodiments, the attribute module 230 may receive the attribute data from a central device that receives attribute data from a plurality of user devices. In still other example embodiments, various user devices may be communicatively coupled in a decentralized device-to-device mesh, and the attribute module 230 may receive the attribute data corresponding to a particular device in the mesh from any of the devices in the mesh. The attribute module 230 may receive the attribute data from the attribute sources in many other configurations including various suitable combinations of configurations.

In various example embodiments, the attribute module 230 may store the attribute data in association with the user (e.g., indexed based on a user identifier) for subsequent analysis. The attribute module 230 may store the attribute data in a storage device such as the database(s) 126, for example. The attribute module 230 may access the stored attribute data using a variety of search or find schemes. For instance, the attribute data associated with a particular user may be accessed using a user identifier that corresponds to the particular user.

At operation 320, the characteristic module 240 may infer a user characteristic or multiple user characteristics corresponding to the user based on an analysis of at least a portion of the attribute data. Characteristics (e.g., the user characteristics or the consumer characteristics), as used herein, are intended to include traits, qualities, actions, activities, attitudes, habits, behaviors, and the like pertaining to a person or people. Inasmuch as the attribute data may not necessarily pertain to a person (e.g., raw data such as coordinates of a particular location), a characteristic (e.g., current location of the user, disliking spicy food, having young children, being a Star Trek fanatic) may be distinct from the attribute data.

The characteristic module 240 may infer or directly measure a vast spectrum of the user characteristics from the attribute data. A few specific examples of user characteristics may include demographic data (e.g., age, gender, marital status, number of children), preferences (e.g., being a morning person, favorite locations, enjoying spicy food), idiosyncrasy (e.g., being forgetful such as draining the battery on a mobile device or being impatient such as a line breaker that will leave a store if the line is too long), qualities (e.g., being athletic, being tall, having a large vocabulary), personality traits (e.g., being a risk taker), actions, activities (e.g., working for a non-profit), attitudes, habits (e.g., being a coffee drinker), behaviors, beliefs, biases, demeanor, and so on. The specificity of the characteristics may range from very narrow (e.g., drinks a particular brand of soda) to very broad (e.g., being generally philanthropic). To illustrate inferring the user characteristic from the attribute data, the attribute data may include user location data that may indicate frequent visits to a local school, local soccer fields, and the like. In this example, the characteristic module 240 may infer that the user has children based on the types of locations the user may be frequently visiting.

In some instances, the characteristic module 240 may perform varying degrees of inferential analysis of the attribute data to derive the user characteristics. For example, the characteristic module 240 may infer the user's wake-up time based on user device activity or other activity (e.g., connected alarm clock settings, logins to accounts, and various other user activities that may indicate a wake-up time). In this example, the characteristic module 240 may infer a particular user characteristic that may be of a larger inferential jump such as the user being a morning person or a person that likes to sleep in. The degree of inferential jump may be configurable. In some example embodiments, the characteristic module 240 may employ various techniques to minimize or otherwise control incorrect inferences (e.g., machine learning, other learning algorithms, etc.).

In further example embodiments, the characteristic module 240 may learn or evolve as more of the attribute data is received. For example, the attribute data may include location data of the user. The characteristic module 240 may infer a favorite location of the user based on a pattern (e.g., frequently visited locations) in the location data. However, the characteristic module 240 may subsequently receive employment data of the user that may indicate a current employer including an employer location. The characteristic module 240 may learn, update, or otherwise adapt to account for the new attribute data. Thus, in this example, the characteristic module 240 may not infer a favorite location of the user if the location is a work location of the user. In some instance, the user may provide input directly (e.g., via a user interface configured to receive inferential guidance from the user) to facilitate the characteristic module 240 in inferring characteristics from the attribute data (e.g., user input indicating that a particular inferred characteristic is incorrect or providing input to be used as a basis for future inferences).

In other instances, the characteristic module 240 may perform very little or no analysis to derive the user characteristic from the attribute data. For example, the attribute data may include an alarm time setting from a connected alarm clock (e.g., a smart phone with an alarm clock app). The alarm time setting may directly indicate a wake-up time. Since the attribute data directly relates to a particular user characteristic, the characteristic module 240 need not perform analysis to derive the user characteristic in these instances.

The user characteristic may comprise predefined characteristics or dynamically determined characteristics. For instance, a particular set of characteristics may be predefined (e.g., work location, home location, marital status, socio-economic level). The characteristic module 240 may determine that particular predefined characteristics are associated with the user based on an analysis of the attribute data. In other instances, the characteristic module 240 may dynamically determine characteristics based on the attribute data. For example, the attribute data may indicate that the user owns a particular exotic pet. Although there may not be a predefined characteristic associated with the particular exotic pet, the characteristic module 240 may determine the user characteristic of owning an exotic pet from the attribute data.

At operation 330, the profile module 250 accesses multiple consumer profiles. The consumer profiles may be stored, for example, in database 126. The consumer profiles may include consumer characteristics associated with a particular kind or type of consumer. The consumer profiles may characterize a consumer or consumers with the consumer characteristics. For instance, a particular consumer may have an affinity for the outdoors. Such a consumer may be characterized with various consumer characteristics such as being athletic, being an avid sports fan, frequently exercising, living in a rural area, and the like. These example consumer characteristics may be included in a particular consumer profile associated with consumers that have an affinity for the outdoors.

The consumer profiles may also be predefined or dynamically generated. For instance, the profile module 250 may automatically generate the consumer profiles by analyzing consumer data that may include consumer characteristics associated with consumers. In this instance, the profile module 250 may group similar consumers together. In other words, consumers with similar consumer characteristics may be associated with a particular consumer profile. A variety of consumer characteristics may be used as a basis for commonality or similarity between consumers such as age group, location, socio-economic status, having children, being sports fan, and so forth. A particular consumer may be associated with multiple consumer profiles. After the profile module 250 identifies a group of similar consumers, the profile module 250 may extract a set of common characteristics that may be representative of the group of similar consumers.

In a specific example, the profile module 250 may identify consumers that are frequent movie goers based on an analysis of the consumer data. The profile module 250 may then extract a set of common consumer characteristics from the consumer data associated with the identified consumers. The extracted set of common consumer characteristics may be included in a particular consumer profile corresponding to frequent movie goers. In this way, the profile module 250 may automatically generate the consumer profiles based on an analysis of the consumer data. Many other schemes and techniques may be employed by the profile module 250 to generate consumer profiles.

At operation 340, the profile module 250 identifies a consumer profile from among the multiple consumer profiles by correlating the inferred user characteristics with respective consumer characteristics of the plurality of consumer profiles. For example, a particular consumer profile among the multiple consumer profiles may include particular consumer characteristics that may be the same or similar to one or more of the inferred user characteristics. Based on the particular consumer characteristics being the same or similar to the inferred user characteristic, the profile module 250 may identify the particular consumer profile.

The profile module 250 employs a variety of schemes and techniques to determine that the inferred user characteristic is the same or similar to a particular consumer characteristic. For instance, the profile module 250 may compare the inferred user characteristics and the consumer characteristics to determine similarity between the inferred user characteristics and the consumer characteristics (e.g., determining a similarity score and identifying similarity when the similarity score exceeds a threshold). In other instances, the profile module 250 may compare a representation of the inferred user characteristics and a representation of the consumer characteristics. In this instance, the representation may be a standardized representation. In a specific example, the inferred user characteristics may be referring to a single street name (e.g., "market street," "Market st.," or "Market ST"). Standardizing the street name may result in standardized form (e.g., "Market St.") that may represent multiple similar forms. Standardizing the inferred user characteristics and the consumer characteristics may provide for direct comparisons between standardized forms of information and for more accurate mathematical analysis to determine similarity between the inferred user characteristic and the consumer characteristic.

In a further example embodiment, the profile module 250 determines characteristic scores for at least a portion of the inferred user characteristics. The characteristic scores may be based on a variety of metrics and data. The characteristic scores may be based, at least in part, on an attribute data metric. The attribute data metric may be a quantity of the attribute data associated with the particular user characteristic, a strength or quality of the attribute data, and so forth. For instance, the profile module 250 may determine a higher characteristic score for a particular inferred user characteristic that is associated with an abundant amount of attribute data.

Further, the attribute data may be weighted as discussed in connection with FIG. 10. The profile module 250 may use the weighting of the attribute data, in part, to determine the characteristic scores. For instance, a particular inferred user characteristic may be associated with a particular portion of the attribute data with a weighting factor. The profile module 250 may determine a higher characteristic score for a particular inferred user characteristic associated with the higher weighting factor than for a lower weighting factor.

In still further example embodiments, the profile module 250 ranks or sorts the inferred user characteristics based on the determined characteristic scores (e.g., the highest characteristic score may rank first). The profile module 250 may identify the consumer profile using the ranked user characteristics. For instance, a higher ranking or scoring inferred user characteristic may be more influential in identifying a particular consumer profile. In some example embodiments, the user characteristics may be excluded or filtered based on the characteristic score. For example, a particular user characteristic associated with a characteristic score below a threshold may be ignored. In further example embodiments, the threshold may be automatically determined using various schemes (e.g., a statistical scheme that excludes based on being a predefined number of standard deviations away from the mean).

In further example embodiments, the profile module 250 may identify a set of consumer profiles that may include multiple consumer profiles from among the plurality of consumer profiles by correlating the inferred user characteristics with respective consumer characteristics of the plurality of consumer profiles. For instance, the inferred user characteristics may be the same or similar to particular consumer characteristics included in multiple consumer profiles among the plurality of consumer profiles. Thus, in some example embodiments, the profile module 250 may identify all, or some, of the consumer profiles among the plurality of consumer profiles that include a particular consumer characteristic that is the same or similar to a particular user characteristic.

In example embodiments, where the profile module 250 may identify the set of consumer profiles, the profile module 250 may further determine profile scores for at least a portion of the identified set of consumer profiles. Similar to the user characteristics, the profile module 250 ranks and sorts the set of consumer profiles based, at least in part, on the profile scores (e.g., the highest profile score ranks first). The profile scores may be based on a variety of metrics and data. In an example embodiment, the profile scores may be based, at least in part, on a profile relevance metric. The profile relevance metric may, for example, include an occurrence count of the of inferred user characteristics associated with the consumer characteristics of a particular consumer profile. A higher count of inferred user characteristics associated with a particular consumer profile may indicate the particular consumer profile is more relevant to the user. For instance, a particular identified consumer profile that is associated with three inferred user characteristics may be associated with a higher profile relevance metric, and thus a higher profile score, than another consumer profile associated with a single inferred user characteristic.

In another example embodiment, the characteristic scores may influence the profile module 250 in determining the profile scores. For instance, a particular consumer profile may be associated with a particular inferred user characteristic with a high characteristic score. In this instance, the profile module 250 may determine a high profile score based, at least in part, on the high characteristic score.

At operation 350, the commerce module 260 identifies a commerce output based, at least in part, on the determined consumer profile. For example, the commerce module 260 may identify products listings on an e-commerce website that the user may be interested in based on the consumer characteristics included in the identified consumer profile. In another example, the commerce module 260 may identify a particular store, brand, location, and other commerce related output that may be of interest to the user (e.g., meeting a nearby friend at a particular restaurant). The commerce module 260 may also access product listing data stored on publication systems 120, other commerce related data stored by third party servers 130, and other data.

The commerce module 260 may operatively associate the consumer characteristics with one or more commerce outputs. In a specific example, the consumer characteristics may include being a coffee drinker. Such a consumer characteristic may be associated with commerce outputs, such as going to coffee shops or purchasing coffee at grocery stores. The associations between the consumer characteristics and the commerce outputs may be predefined or dynamically generated. For instance, the commerce module 260 may dynamically associate commerce outputs with consumer characteristics by analyzing the consumer data that may include consumer characteristics associated with a plurality of consumers, similar to the above discussion regarding an embodiment of the operation 330. The consumer data may also include commerce results (e.g., a consumer purchasing a product). The commerce module 260 may identify the commerce output by correlating the consumer characteristics included in the identified consumer profile with the commerce results and consumer characteristics included in the commerce data. In a specific example, the identified consumer profile may include the consumer characteristic of being a golfer. The commerce module 260 may analyze the commerce data to identify various commerce outputs that a golfer may be interested in. The commerce module 260 may employ many other schemes and techniques to identify the commerce output based on the consumer profile.

In further example embodiments, the commerce module 260 may access secondary data that includes secondary attribute data associated with consumers. The secondary data may include a diverse array of consumer data that may not necessarily be associated with the user. For instance, the secondary data may include demographic information for movie goers to a particular movie, weather data in relation to particular consumer activities (e.g., what particular types of consumer do during various weather conditions), and so on. The commerce module 260 may identify the commerce output based on an analysis of the secondary data and the identified consumer profile. For instance, the commerce module 260 may identify multiple commerce outputs based on the identified consumer profile and subsequently filter the identified commerce outputs according to the secondary data. In this way, the commerce analytics system 123 may further refine the commerce outputs to identify commerce outputs relevant to the user using secondary data that may not be associated with the user.

The commerce module 260 may identify the commerce output based, at least in part, on the profiles scores. For example, the set of consumer profiles may be ranked according to respective profile scores of the set of consumer profiles. In this example embodiment, the commerce module 260 may identify the commerce output based, at least in part, on the ranked set of consumer profiles. For instance, the commerce module 260 may identify a particular commerce output associated with the highest-ranking consumer profile or exclude a particular commerce output associated with the lowest-ranking consumer profile.

The commerce module 260 may further identify a set of commerce outputs based on the identified consumer profiles and rank or sort the set of commerce outputs based, at least in part, on the ranked set of consumer profiles, the secondary data, the characteristic scores, other metrics, and so on. In an example embodiment, the commerce module 260 may determine a commerce output score for at least a portion of the set of commerce outputs. The commerce output score may be based on a variety of data and metrics. The commerce module 260 may use profile scores, characteristics scores, attribute weighting factors, attribute metrics, or any suitable combination thereof to determining the commerce output scores. In some example embodiments, a particular commerce output may be excluded from the set of commerce output if associated the commerce output score is below a threshold.

The commerce module 260 may identify the commerce output based on first order characteristics, second order characteristics, third order characteristics, or other higher order characteristics. The first order characteristics may have a direct relationship with the attribute data. For example, the first order characteristics may be consumer characteristics included in the identified consumer profile that are the same or similar to the inferred user characteristic. Thus, the first order characteristics may be directly related to the attribute data from which the inferred user characteristic was derived.

FIG. 4 is a flow diagram illustrating further example operations of the example method 300 of FIG. 3 according to some example embodiments. Subsequent to the operation 340, at the operation 350, the commerce module 260 identifies the commerce output based on the identified consumer profile. The operation 350 may include the additional operations of FIG. 4.

At operation 410, the profile module 250 determines second order characteristics included in the identified consumer profile. The second order characteristics may have an indirect relationship with the attribute data. For example, the identified consumer profile may include multiple consumer characteristics. In some instances, the inferred user characteristics may correlate to some, but not all, of the consumer characteristics included in the identified consumer profile. In these instances, the consumer characteristics that do not correlate to the inferred user characteristics may be second order characteristics as they are not directly associated with the attribute data.

At operation 420, the commerce module 260 may identify the commerce output based, at least in part, on the second order characteristics. Similar to the operation 350 as discussed above, the operation 420 may identify the commerce output using a variety of schemes and techniques. The above discussion of the profile module 250 determining the characteristics scores applies equally to second order characteristics. In an example embodiment, the profile module 250 may determine the characteristic scores for the second order characteristics based, at least in part, on a relevance metric corresponding to respective second order characteristics. The relevance metric may, for example, indicate how relevant a particular second order characteristic may be to the user. For example, the profile module 250 may determine that a particular second order characteristic is found in multiple consumer profiles of the identified set of consumer profiles. Such a second order characteristic may be more relevant than a second order characteristic found in a single consumer profile among the identified set of consumer profiles.

The profile module 250 may rank or sort the second order characteristics based on the characteristic scores. The commerce module 260 may identify the commerce output based, at least in part on the ranked second order characteristics. For instance, the highest ranking second order characteristic may be more influential in the commerce module 260 determining the commerce output.

FIG. 5 is a flow diagram illustrating further example operations of the example method 300 of FIG. 3 according to some example embodiments. Subsequent to the operation 340, at the operation 350, the commerce module 260 may identify the commerce output based on the identified consumer profile. The operation 350 may include the additional operations of FIG. 5.

At operation 510, the profile module 250 identifies a complementary consumer profile by correlating the identified consumer profile with respective consumer profiles of the plurality of consumer profiles. For instance, the second order characteristics of identified set of consumer profiles may be correlated with respective consumer characteristics of the plurality of consumer profiles. The above discussion of the profile module 250 identifying the consumer profile from among the plurality of consumer profile at the operation 340 applies equally to identifying the complementary consumer profile at the operation 510. Similarly, the above discussion of the profile module 250 determining the profile scores applies equally to complementary consumer profiles. In an example embodiment, the profile module 250 may identify a set of complementary consumer profiles that includes multiple complementary consumer profiles and rank or sort the identified set of complementary consumer profiles according to respective profile scores of the set of complementary consumer profiles.

At operation 520, the profile module 250 determines third order characteristics included in the complementary consumer profile. Similar to the second order characteristics, the third order characteristics may be characteristics with an indirect relationship with the attribute data. In some example embodiments, the third order characteristics may be related to the second order characteristics. For example, the profile module 250 may identify additional complementary consumer profiles based on the second order characteristics. The characteristics included in the complementary consumer profiles, other than first and second order characteristics, may be the third order characteristics. The third order characteristics may have a more indirect relationship with the attribute data than the second order characteristics.

At operation 530, the commerce module 260 identifies the commerce output based, at least in part, on the third order characteristics. Similar to the operation 350 as discussed above, the operation 530 may identify the commerce output using a variety of schemes and techniques. The above discussion of the profile module 250 determining the characteristic scores applies equally to third order characteristics. In an example embodiment, the profile module 250 may determine the characteristic scores for the third order characteristics based, at least in part, on the relevance metric corresponding to respective third order characteristics. The relevance metric may, for example, indicate how relevant a particular third order characteristic may be to the user. For example, the profile module 250 may determine that a particular third order characteristic is found in multiple consumer profiles of the identified set of consumer profiles.

Such a third order characteristic may be more relevant than a third order characteristic found in a single consumer profile among the identified set of consumer profiles. Additionally, the profile module 250 may filter the third order characteristics based on the attribute data. For instance, the attribute data may indicate that a particular third order characteristic is not relevant.

Referring back to FIG. 3, at operation 360, the presentation module 210 may cause recommendation of the commerce output to the user. Many forms and varieties of causing recommendation may be employed by the presentation module 210. For example, the presentation module 210 may cause presentation or interactive presentation of an advertisement associated with the commerce output to the user. The term "interactively presenting" is intended to include the exchange of information between a particular device and the user. In another example, the presentation module 210 may augment search results to emphasize or highlight the commerce output. The presentation module 210 may cause recommendation of the commerce output in many other ways.

Figure 6:
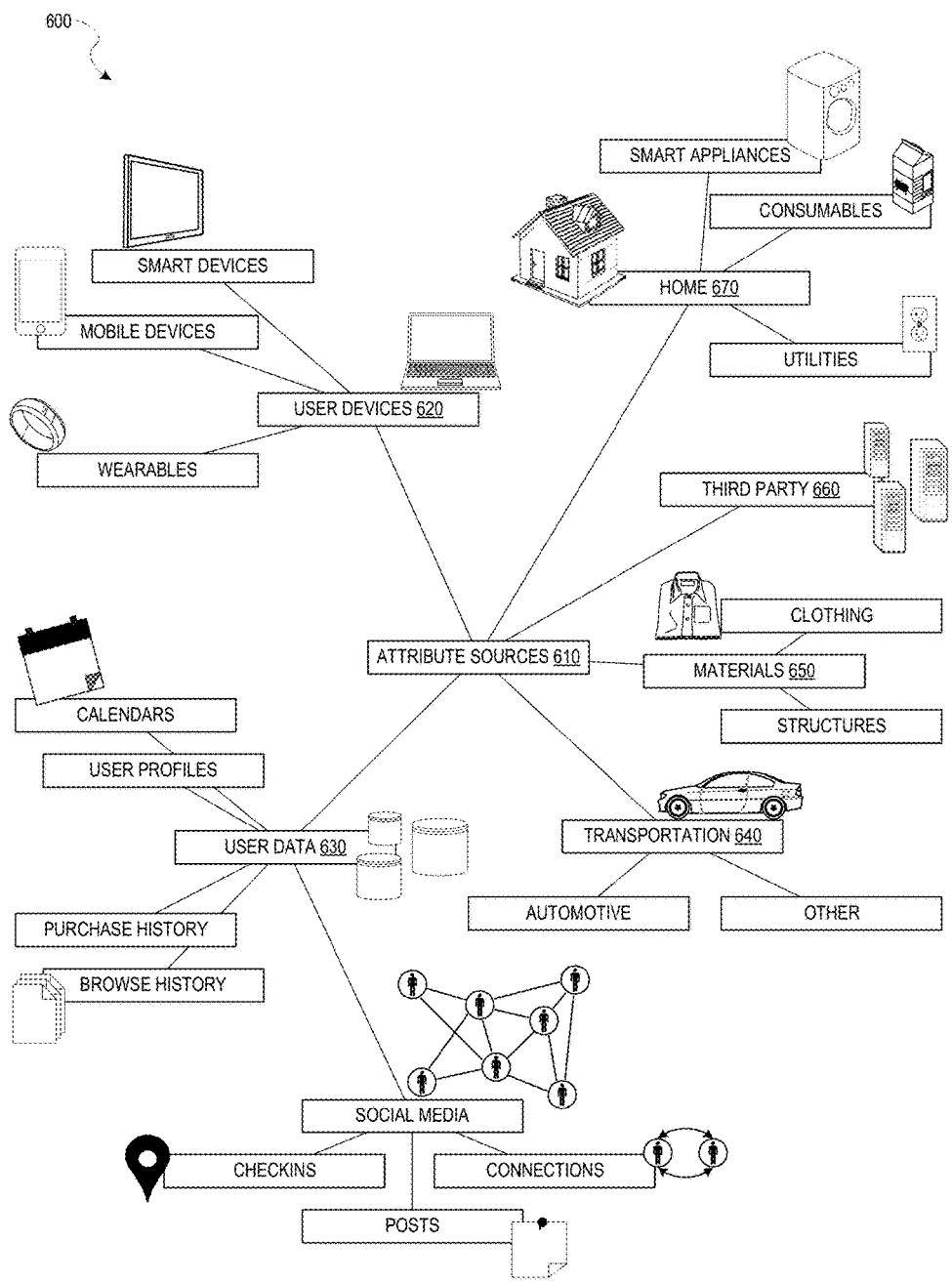
FIG. 6 is a spider diagram depicting various example attribute sources according to some example embodiments.
Figure 7:
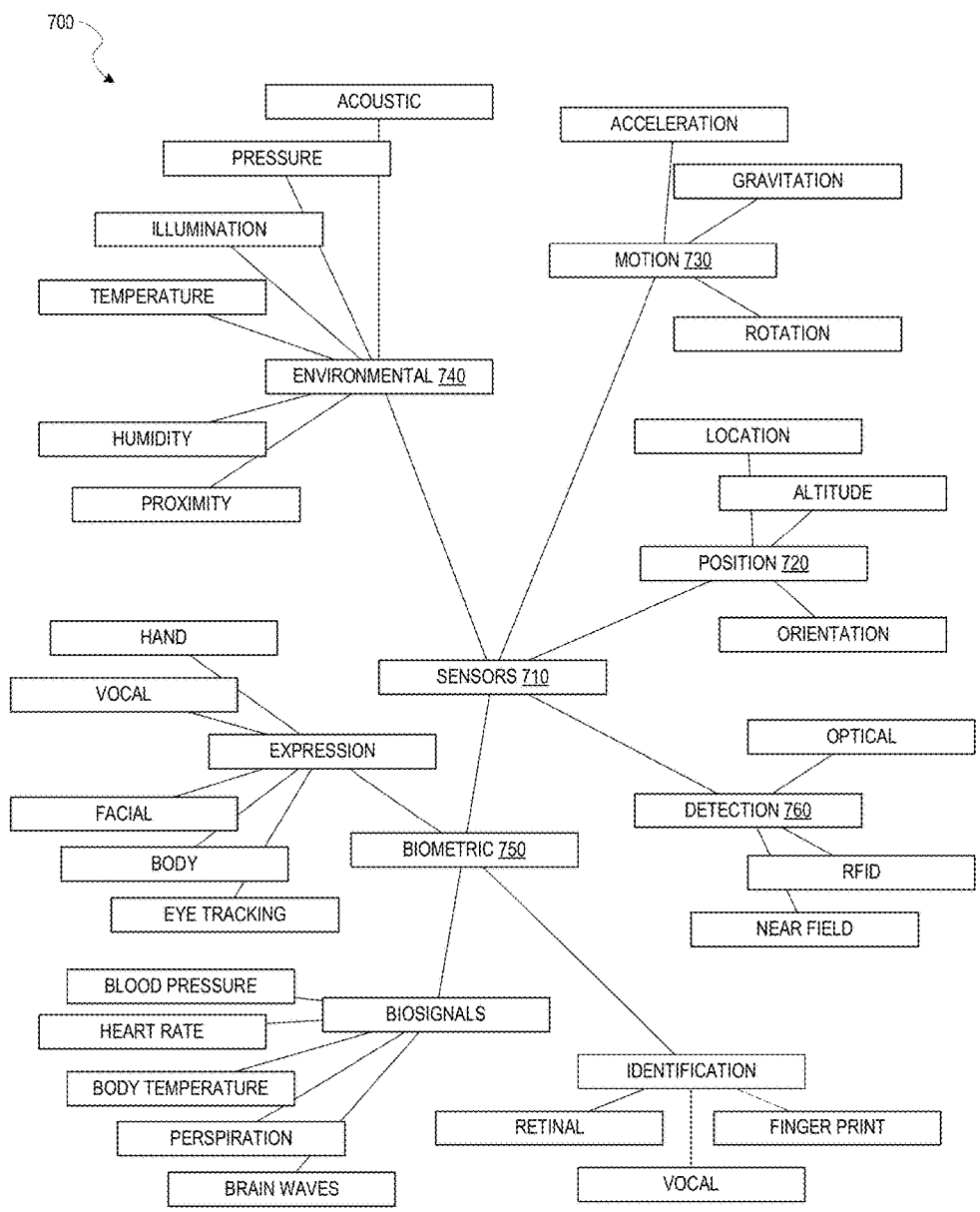
FIG. 7 is a spider diagram depicting various sensors according to some example embodiments.

Referring now to FIGS. 6 and 7, the following discussion will explore the diversity of sources of the attribute data. FIG. 6 depicts example sources 600 including attribute sources 610 that may provide a variety of attribute data, according to example embodiments. The example embodiments describe herein may access a vast and rich "Internet of Things" (IoT) dataset that is predominantly provided via communicatively connected, interconnected, or otherwise coupled machines and devices that may incorporate a multitude of sensors. The attribute data received from the attribute sources 610, as described herein, is intended to include at least a portion of the IoT dataset and may be received in real-time or near real-time from devices of the IoT. For example, the attribute sources 610 may provide data including everything from a moisture level of a houseplant to a dribbling rhythm of a basketball. In an example embodiment, attribute sources 610 may include user device sources 620, user data sources 630, transportation sources 640, materials sources 650, third party sources 660, home sources 670, and a variety of other sources. The attribute module 230 may receive the attribute data from the attribute sources 610 and may store (e.g., in the database(s) 126) the attribute data in association with the user (e.g., the attribute data may be retrieved using a user identifier) for subsequent analysis. As will be discussed in connection with FIG. 7 the attribute sources 610 may be associated with a wide variety of sensors, gauges, and measurement components.

The attribute sources 610, and devices included therein, may be communicatively coupled in a variety of configurations to provide access to the attribute data. In some example embodiments, the attribute sources 610 may be communicatively coupled to a central attribute source and the attribute data may be received from the central attribute source. In other words, the central attribute may aggregate the attribute data received or accessed from multiple attribute sources and provide a centralized point for the attribute module 230 to access the attribute data. In another example configuration, the attribute sources 610 may be communicatively coupled in a decentralized device-to-device mesh and the attribute data corresponding to a particular device in the mesh may be received from any one or more of the devices in the mesh. Many other configurations of the attribute sources 610 or suitable combinations of configurations may be employed.

The user device sources 620 may include such non-limiting examples as a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, and so forth. The attribute data received from the user device sources 620 may include data received from various components of the user devices such as environmental sensor data (e.g., ambient temperature), biometric sensor data (e.g., hear rate), detection data (e.g., detection of a Near Field Communication (NFC) beacon), motion data (e.g., acceleration), position data (e.g., location as determined by a Global Positioning Component of a mobile device), and so forth. In further example embodiments, the attribute data received from the user devices may include information such as device type, device model, a unique device identifier, and other device parameters. In some example embodiments, the characteristic module 240 may infer information about the data received based on the device type. For instance, if the device type is a mobile device, the characteristic module 240 may infer that the location data of the mobile device may be the location of the user of the mobile device. Similarly, if the device type is a media entertainment system, the characteristic module 240 may infer that the data received from the media entertainment system may be associated with the home of the user. The characteristic module 240 may determine many other inferences based on the attribute data received from the user device sources 620.

The user data sources 630 may include calendars (e.g., user calendar events such as birthdays, trips, exams), user profiles (e.g., demographic information such as age, gender, income level), purchase histories, browse histories, social media (e.g., checkins, posts, connections), other user data (e.g., bookmarked websites, preferences or settings for various applications), and the like. The user data may be stored, for example, in the user device sources 620 (e.g., a mobile device that includes a mobile browser with browse history of the user), application servers 118 (e.g., payment history of the user stored in payment systems 122, user profiles stored by an e-commerce website), third party servers 130 (e.g., social media data stored in a social networking service), and so on.

As cars and other forms of transportation become increasingly equipped with sensors and the ability to communicate, a vast amount of data may be provided by the transportation sources 640. For example, the attribute data corresponding to the transportation sources 640 may include acceleration data, velocity data, and other sensor data (e.g., brake pad wear data, gear shifting data). In this example, the attribute data corresponding to the transportation sources 640 may provide indications of a user's driving patterns and styles (e.g., comes to a complete stop at a stop sign, speeds, or finicky use of the brakes).

The materials sources 650, such as clothing and structures, are also increasingly gaining the ability to capture information. For example, clothing may be embedded with sensors to detect motion. Such data may provide indications of whether the user is agile or inactive. In another example, clothing may be embedded with biometric sensors that may provide a continuous feed of biometric data corresponding to the user. The biometric data may provide indications of the user's health, athletic ability, and many other characteristics corresponding to the user. The characteristic module 240 may infer athletic ability, health conditions, and many other characteristics from the attribute data received from the materials sources 650. Similarly, structures may be equipped with sensor to passively or actively monitor the surrounding environment (e.g., street cameras, traffic cameras, and other sensors).

Third party sources 660 may also provide an abundance of information associated with the user. For instance, government websites or other public records that may provide criminal histories, civil citation histories, credit histories, other publicly available information, and the like. The characteristic module 240 may utilize such information to directly infer the user characteristics or infer the user characteristics in conjunction with other attribute data.

Nearly every facet of a smart home may be capable of providing attribute data that may be utilized by the characteristic module 240 to infer the user characteristics. The home sources 670 may provide an abundant and rich source of the attribute data. For instance, the home sources 670 may include smart appliances, consumables, utilities, and many other smart home devices. In a few specific instances, consumable inventories and consumption rates of various consumable goods (e.g., milk, bread) may be tracked or monitored by smart refrigerators and provided to the attribute module 230. In another instance, utility usage (e.g., electricity, water) may be tracked and the characteristic module 240 may infer various user characteristics based on the usages patterns (e.g., the user may be on vacation, the user may be an energy conscious person). Analysis of the utility usage data may indicate patterns or a status of the user, such as the user being on vacation, the user being ill (e.g., increasing house thermostat set temperature to cope with a cold), the user being an energy conscious consumer, and so on.

FIG. 7 depicts example sensors, gauges, and measurement components 700 that may be included in any one of the attribute sources 610 depicted in FIG. 6. Any suitable combination of sensors, gauges, and measurement components 700 may be implemented to facilitate the functionality described herein. FIG. 7 merely depicts non-limiting examples of sensors, gauges, and measurement components and many other components that provide various sensor data may be included in any suitable one or more of the attribute sources 610. Sensor components 710 may receive, detect, measure, or capture sensor data associated with physical properties or attributes. The sensor components 710 may provide, produce, transmit, or communicate the sensor data or other indications associated with physical properties or attributes. Hence, the sensor data corresponding to the sensor components 710 may be accessible to all, or some, of the modules described above on a real-time or near real-time basis.

In various example embodiments, the sensor components 710 may include position components 720. The position components 720 may include location sensors (e.g., a Global Position System (GPS) receiver component), altitude sensors (e.g., altimeters or barometers that detect air pressure from which altitude may be derived), orientation sensors (e.g., magnetometers that provide magnetic field strength along an x, y, and z axes), and the like. In an example embodiment, the position components 720 may provide position data such as latitude, longitude, altitude, and a time stamp. The position data may be provided at a regular update rate (e.g., 10 updates per second) that may be configurable.

In further example embodiments, the motion components 730 may include acceleration sensors (e.g., accelerometer), gravitation sensors, rotation sensors (e.g., gyroscope), and so forth. The motion components 730 may provide motion data such as velocity, acceleration, or other force measurements along the x, y, and z axes. Similar to the position components 720, the motion components 730 may provide the motion data at a regular update rate that may be configurable.

In some further example embodiments, the sensor components 710 may include environmental components 740. The environmental components 740 may include illumination sensors (e.g., photometer), temperature sensors (e.g., one or more thermometers that detect ambient temperature), humidity sensors, pressure sensors (e.g., barometer), acoustic sensors (e.g., one or more microphones that detect background noise), proximity sensors (e.g., an infrared sensor that detects nearby objects), gas sensors (e.g., e.g., machine olfaction detection sensors, gas detection sensors to detect concentrations of hazardous gases for safety or to measure pollutants in the atmosphere), and so on. The environmental components 740 may measure various physical parameters to provide an indication or signal corresponding to the physical environment surrounding the environmental components 740.

In some example embodiments, the sensor components 710 may include biometric components 750 that may detect expressions, measuring biosignals, or identify people among other functions. For example, the biometric components 750 may include expression components to detect expressions (also referred to as "kinesics") such as hand gestures (e.g., an optical component to detect a hand gesture or a Doppler component to detect hand motions), vocal expressions (e.g., a microphone to detect changes in voice pitch that may indicate tension), facial expressions (e.g., a camera to detect expressions or micro-expressions of a person such as a smile), body gestures, eye tracking (e.g., detecting the focal point of a person's eyes or patterns in eye movement), and so on. The biometric components 750 may also include, for example, biosignal components to measure biosignals such as blood pressure, heart rate, body temperature, perspiration, brain waves (e.g., as determined by a electroencephalogram), and the like. In further examples, the biometric components 750 may include identification components to identify people such as retinal scanners (e.g., a camera component), vocal detectors (e.g., a microphone to receive audio data for voice identification), facial detectors, finger print detectors, electroencephalogram sensors (e.g., to identify a person via unique brain wave patterns), and so forth.

In still further example embodiments, the sensor components 710 may include detection components 760 that may detect a variety of identifiers. For example, the detection components 760 may include Radio Frequency Identification (RFID) tag reader components, Near Field Communication (NFC) smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), and so on. In additional, a variety of information may be derived via various communication components such as location via Internet Protocol (IP) geo-location, location via WI-FI® signal triangulation, location via detecting a NFC beacon signal that may indicate a particular location, and so forth.

Figure 8:
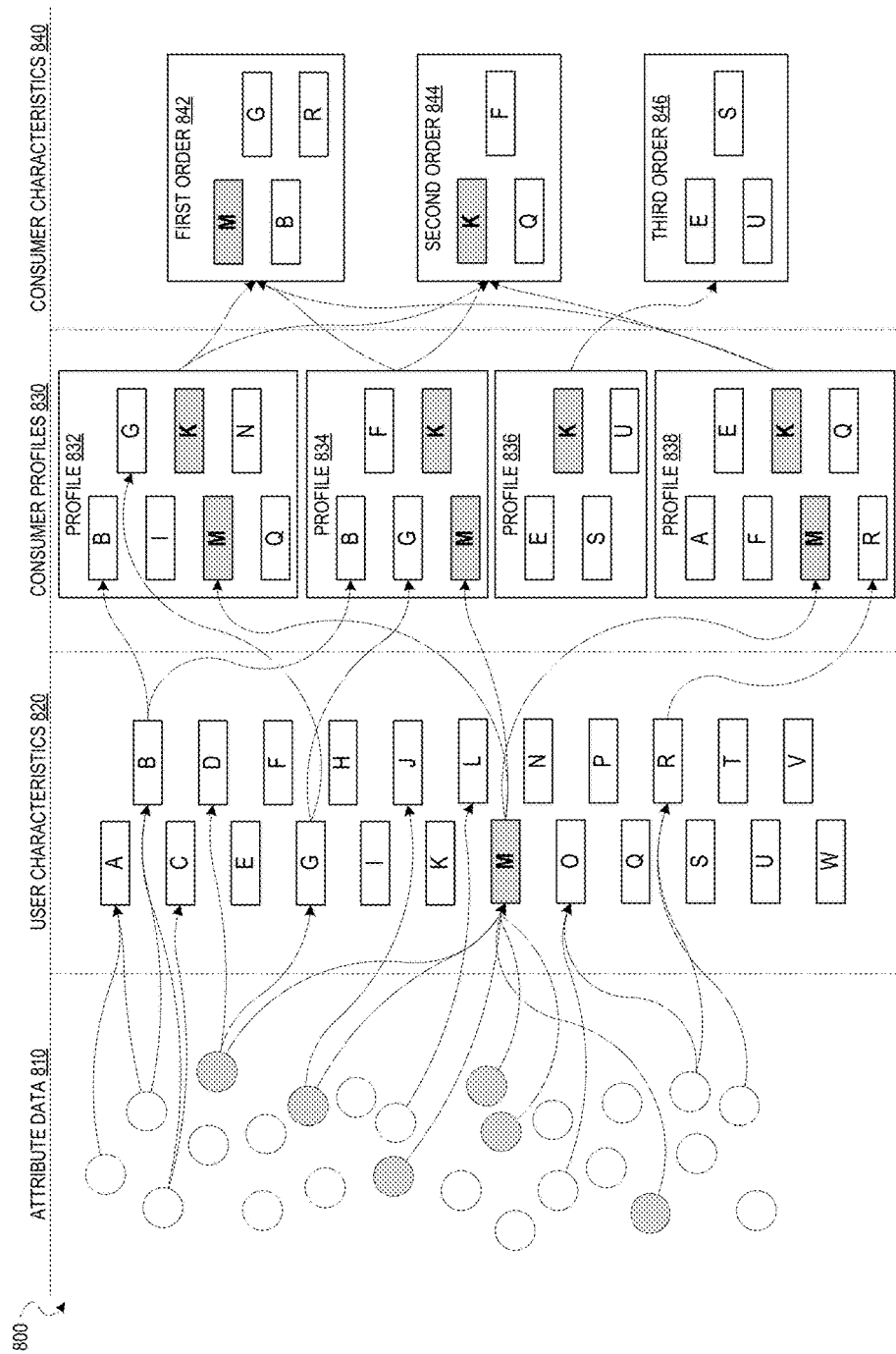
FIG. 8 is a swim-lane diagram illustrating an example of analysis to determine a commerce output based on consumer profiles according to some example embodiments.

The above discussion in connection with FIGS. 6 and 7 has provided an understanding of the breadth and depth of the attribute data and the following discussion will again be directed to use and application of the attribute data. FIG. 8 illustrates a diagram 800 showing an example commerce analysis to determine the commerce output based on the identified consumer profiles according to some example embodiments. Specifically, the diagram 800 shows an example of inferring user characteristics 820 from attribute data 810, identifying consumer profiles 830 from the inferred user characteristics 820, and identifying various consumer characteristics 840, such as first order characteristics 842, second order characteristics 844, third order characteristics 846, that may be used to identify the commerce output. In particular, the third order characteristics 846 may be used by the commerce module 260 to identify certain commerce outputs that may not be intuitively related to the attribute data 810 or the inferred user characteristics 820.

The attribute data 810 may be example attribute data received from the attribute sources (e.g., the attribute sources 610). The circles shown in FIG. 8 may be example portions of the attribute data 810. As discussed above, a wide variety of data from many different sources may be included in the attribute data 810. In some instances, only a portion of the attribute data 810 may be used by the characteristic module 240 to infer the user characteristics 820.

The user characteristics 820 may include example user characteristics labeled A through W. The lines from portions of the attribute data 810 to the user characteristics 820 may indicate a relationship between a particular portion of the attribute data 810 and a particular user characteristic of the user characteristics 820. For instance, the characteristic module 240 may infer a particular user characteristic, such as user characteristic 820 labeled M, based on various portions of the attribute data 810 as indicated by the lines from various portions of the attribute data 810 and M. The characteristic module 240 may infer other user characteristics 820, such as user characteristics 820 labeled A, B, C, D, G, J, L, O, and R, based on the attribute data 810 as shown in FIG. 8. As discussed above, the profile module 250 may determine the characteristic scores based on the attribute data 810. In this instance, M may be associated with a high characteristic score as many portions of the attribute data 810 are associated with M.

The consumer profiles 830 may include example consumer profile, such as profile 832, profile 834, profile 836, and profile 838, with example consumer characteristics (the consumer characteristics shown as squares inside the profiles labeled with various letters). In an example embodiment, the profile module 250 may identify specific consumer profiles from among the plurality of consumer profiles 830 by correlating the inferred user characteristics 820 with respective consumer characteristics of the plurality of consumer profiles. As shown in FIG. 8, the profile module 250 may identify the profile 832, the profile 834, and the profile 838 based on these profiles including the consumer characteristic M, or the consumer characteristics A, B, C, D, G, J, L, O, or R. For instance, the user characteristic M may be the same or similar to the consumer characteristic M included in the profile 832, the profile 834, and the profile 838. In this example, the profile module 250 may not identify profile 836 since it does not include the inferred user characteristics A, B, C, D, G, J, L, M, O, or R. In other examples, the profile module 250 identify other consumer profiles including A, B, C, D, G, J, L, O, or R that may not necessarily include M.

The profile module 250 may determine the characteristic scores for the user characteristics 820 according to a variety of factors as discussed above. In various example embodiments, the profile module 250 may ignore a particular user characteristic (e.g., C) or give more influence to a particular user characteristic (e.g., M) when identifying the consumer profiles 830 based on respective characteristic scores associated with the user characteristics 820. Similarly, the profile module 250 may determine the profiles scores for the consumer profiles 830 based on a variety of factors as discussed above. For instance, the profile 838 may be associated with a lower profile score than profile 834 since the profile 838 may be associated with fewer of the user characteristics 820.

The consumer characteristics 840 may include various consumer characteristics included in the consumer profiles 830. For example, the first order characteristics 842 may have a direct relationship with portions of the attribute data 810. For instance, the first order characteristics may comprise particular consumer characteristics that are the same or similar to the user characteristics 820 inferred from the attribute data. As shown in FIG. 8, the first order characteristics 842, including M, G, B, and R, may be the same or similar to user characteristics M, G, B, and R that may have been inferred directly from the attribute data 810. Hence, the first order characteristics 842 may be directly related to the attribute data 810.

The second order characteristics 844 may be consumer characteristics included in the identified set of consumer profiles, such as the profile 832, the profile 834, and the profile 838, which may not be directly related to the attribute data 810. For instance, the profile 832 includes consumer characteristics I, K, N, and Q that are not directly related to the user characteristics 820 inferred from the attribute data 810. All, or some, of I, K, N, and Q may be a second order characteristic. As discussed above, the profile module 250 may determine the characteristic scores for the second order characteristics 844 and subsequently rank or filter the second order characteristics 844 based on respective characteristics scores. For instance, the characteristics scores for the second order characteristics 844 may be based, at least in part, on the relevance metric such as an occurrence count of the second order characteristic within the identified consumer profiles. In the example of FIG. 8, the consumer characteristic K may be associated with a high characteristic score as it occurs in multiple consumer profiles among the identified set of consumer profiles 830. Conversely, the consumer characteristic N may be associated with a low characteristic score as it only occurs in a single consumer profile among the identified set of consumer profiles 830. The profile module 250 may filter out consumer characteristics with low profile scores, such as N.

The third order characteristics 846 may be consumer characteristics included in the identified set of complementary consumer profiles. As discussed above, the profile module 250 may identify one or more complementary consumer profiles based on the consumer characteristics included in the identified set of consumer profiles 830. As shown in FIG. 8, the profile module 250 may identify profile 836 based on the second order characteristics 844. Specifically, K may be a particular second order characteristic 844 with a high characteristic score. On that basis, the profile module 250 may identify various complementary consumer profiles that include K (e.g., the profile 836). In various example embodiments, the complementary consumer profiles may not include any of the consumer characteristics that are the same or similar to the user characteristics 820. The third order characteristics 846 may be consumer characteristics 840 included in the complementary profiles that are not directly related to the attribute data 810 and that have not already been identified. For instance, E, S, and U may be third order characteristics 846 since they are included in the complementary consumer profile.

The commerce module 260 may identify the commerce output based on the identified consumer profiles. In particular, the commerce module 260 may identify the commerce output based on the consumer characteristics 840 included in the identified consumer profiles. In various example embodiments, the second order characteristics 844 and the third order characteristics 846 may be used to identify commerce outputs that may not be directly related to the attribute data 810. This may provide the benefit of identifying a particular commerce output that analysis based merely on the attribute data 810 would fail to recognize.

In further example embodiments, the profile module 250 may identify higher order characteristics (e.g., fourth order, fifth order) similar to the way the profile module 250 identified the third order characteristics 846. For example, the profile module 250 may identify additional consumer profiles based on the third order characteristics 846 and the profile module 250 may identify higher order characteristics from consumer characteristics included in the additional consumer profiles. As the order of the consumer characteristics increase, the relationship between the higher order characteristics and the attribute data 810 may become more tenuous. To identify relevant consumer characteristics from among the higher order characteristics, the higher order characteristics may be ranked or filtered similar to the third order characteristics 846. In this way, non-intuitive or unforeseen consumer characteristics relevant to the user may be identified and used as a basis to identify commerce outputs that would otherwise be unknown.

Figure 9:
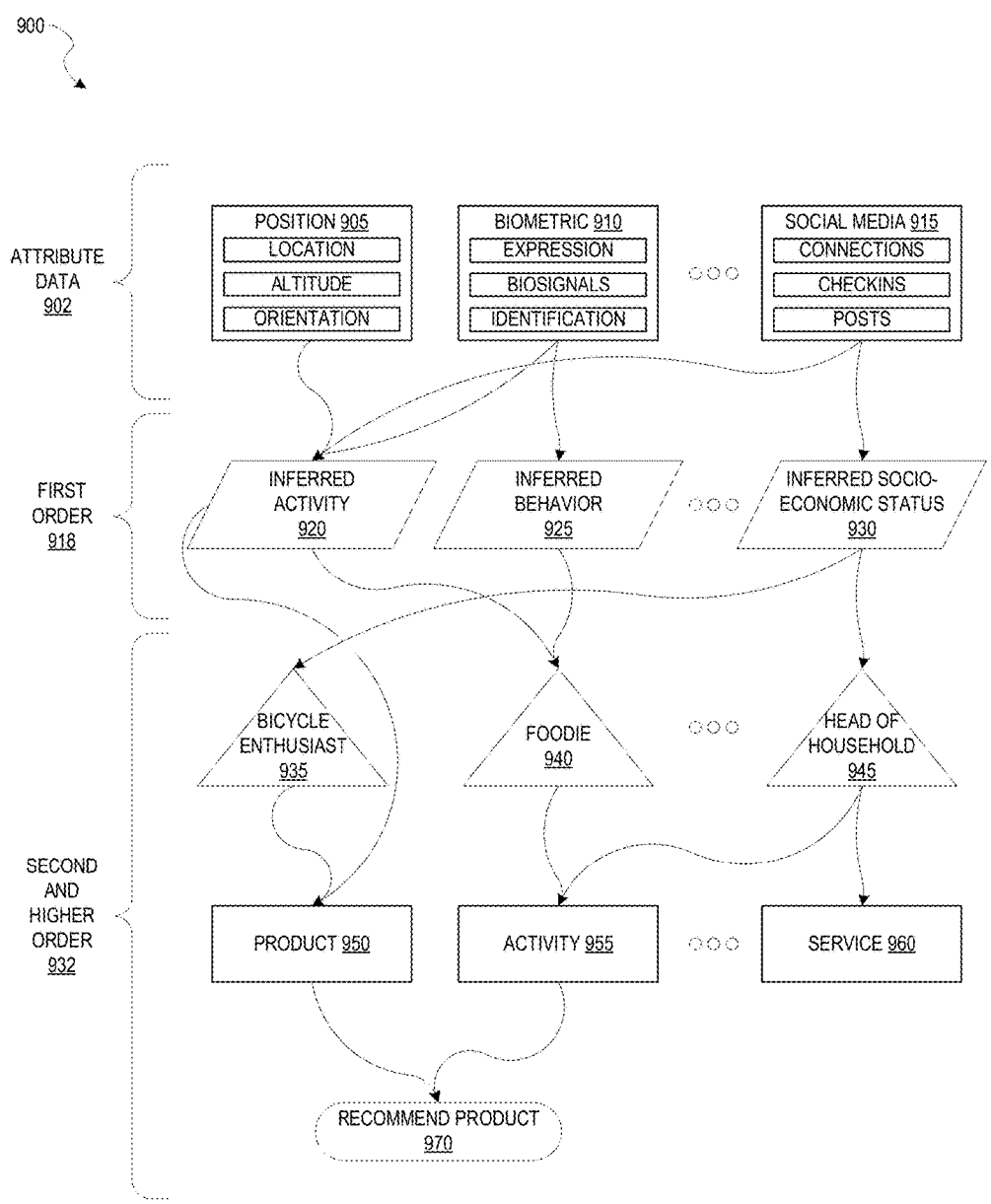
FIG. 9 is a diagram illustrating determining a commerce output according to some example embodiments.

FIG. 9 is a flow diagram 900 illustrating an example of determining the commerce output based on the attribute data according to some example embodiments. In an example embodiment, the attribute module 230 may receive attribute data 902 that may include, for example, position data 905 (e.g., as determined by a GPS component of a user device), biometric data 910, and social media data 915. For instance, the position data 905 may indicate that the user is near a jogging trail, the biometric data 910 may indicate vigorous physical activity of the user, and the social media data 915 may indicate an upcoming running event the user may be participating in. The characteristic module 240 may analyze the attribute data 902 and infer the user characteristics such as an inferred activity 920 (e.g., the user may be biking), an inferred behavior 925 (e.g., the user is competitive), or an inferred socio-economic status 930 (e.g., upper middle class). From the inferred user characteristics, first order characteristics 918 may be identified and used to identify the commerce output. For example, a particular first order characteristic that may be identified may be that the user is a competitive bicyclist and the identified commerce output may be to promote bicycle equipment.

Subsequently, the profile module 250 may identify the consumer profiles, such as bicycle enthusiast 935, foodie 940, or head of household 945, based on the inferred user characteristics. For example, the inferred user characteristics may be the same or similar to various consumer characteristics included in the bicycle enthusiast 935 consumer profile. In an example embodiment, the head of household profile 945 may be a complementary consumer profile identified based on the bicycle enthusiast 935 consumer profile.

After the profile module 250 identifies the consumer profiles, the commerce module 260 may identify the commerce outputs, such as product 950, activity 955, or service 960 based on the consumer characteristics included in the bicycle enthusiast 935, foodie 940, and head of household 945 profiles. For example, the profile module 250 may analyze the identified consumer profile to identify second and higher order characteristics 932 and subsequently the commerce module 260 may identify commerce outputs based on the second and higher order characteristics 932.

Identifying the commerce output based on the second and higher order characteristics 932 may provide various commerce outputs that are not directly related to the attribute data 902. For instance, the foodie 940 profile may include a particular consumer characteristic such as going to Broadway musicals. The commerce module 260 may then identify commerce outputs, such as going to a musical, based on that second order characteristic. The commerce module 260 may further filter or refine the identified commerce outputs and finally recommend the commerce output to the user (e.g., recommend product 970). In this way, the commerce analytics system 123 may identify and recommend commerce outputs that are not necessarily directly related to the attribute data 902.

Figure 10:
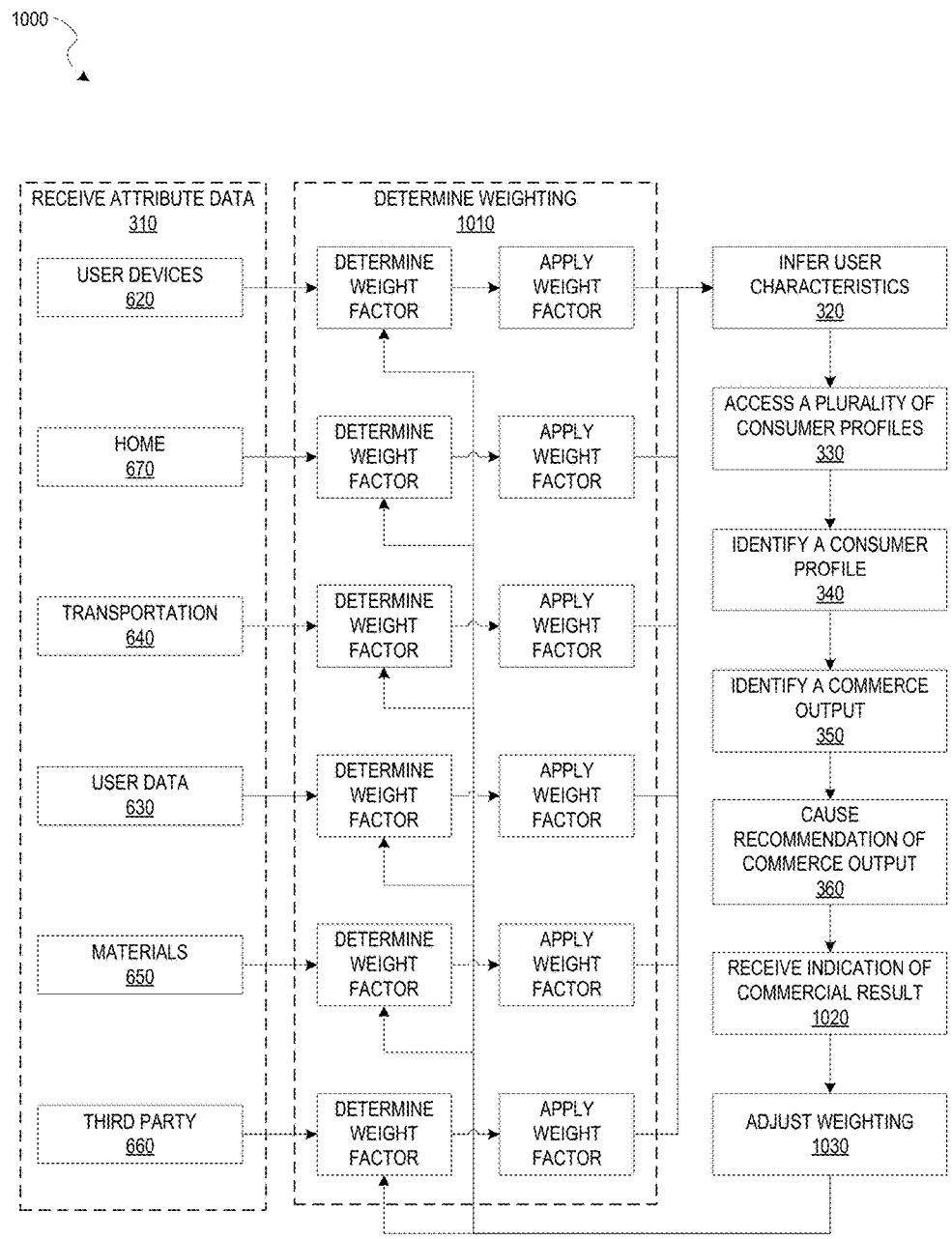
FIG. 10 is a flow diagram illustrating weighting attribute data according to some example embodiments.

FIG. 10 is a flow diagram 1000 illustrating weighting the attribute data according to some example embodiments. In an example embodiment, the operation 310 may receive the attribute data from the plurality of attribute sources that may include the user device sources 620, the user data sources 630, the transportation sources 640, the materials sources 650, the third party sources 660, the home sources 670, and a variety of other sources. At operation 1010, the characteristic module 240 may determine weighting for portions of the attribute data. For example, the characteristic module 240 may determine a weighting factor and apply the weighting factor to a particular portion of the attribute data. In a specific example, a particular portion of the attribute data may be more indicative of a particular user characteristic. On that basis, the characteristic module 240 may determine that the weighting factor for that particular portion of the attribute data may be higher than other portions of the attribute data.

After the characteristic module 240 determines and applies the weighting factor, at the operation 320, the characteristic module 240 infers the user characteristic based on the weighted attribute data. At the operation 330, the profile module 250 may access a plurality of consumer profiles that includes consumer characteristics. At the operation 340, the profile module 250 may identify the consumer profile. At the operation 350, the commerce module 260 may identify the commerce output. At the operation 360, the presentation module 210 may cause recommendation of the commerce output to the user.

Subsequent to the identified commerce output being recommended to the user, at operation 1020, the characteristic module 240 or the profile module 250 may receive an indication of commercial result. For example, the indication of commercial result may be an indication that the user purchased the product recommended at the operation 360. The profile module 250 may receive many other indications of the commercial result such as user engagement indications (e.g., time spent looking at a particular advertisement, clicking on a particular advertisement), user activity (e.g., user initiated browse sessions including keywords, social posts related to the commerce output), other metrics that indicate the user's interest in the commerce output, and so forth.

At operation 1030, the characteristic module 240 adjusts the weighting factors used at the operation 1010 based on the indication of the commercial result. For instance, the commercial result may indicate that a particular portion of the attribute data is indicative of a particular user characteristic and should be assigned a higher weight factor. In specific instance, types of movies the user views on a home entertainment media system may be strongly correlated to apparel purchases of the user. In this specific instance, the types of movies the user views may be associated with a higher weighting factor when the characteristic module 240 may be inferring the user characteristics associated with apparel. Many schemes may be employed by the characteristic module 240 to determine weighting factors for portions of the attribute data (e.g., machine learning algorithms).

Figure 11:
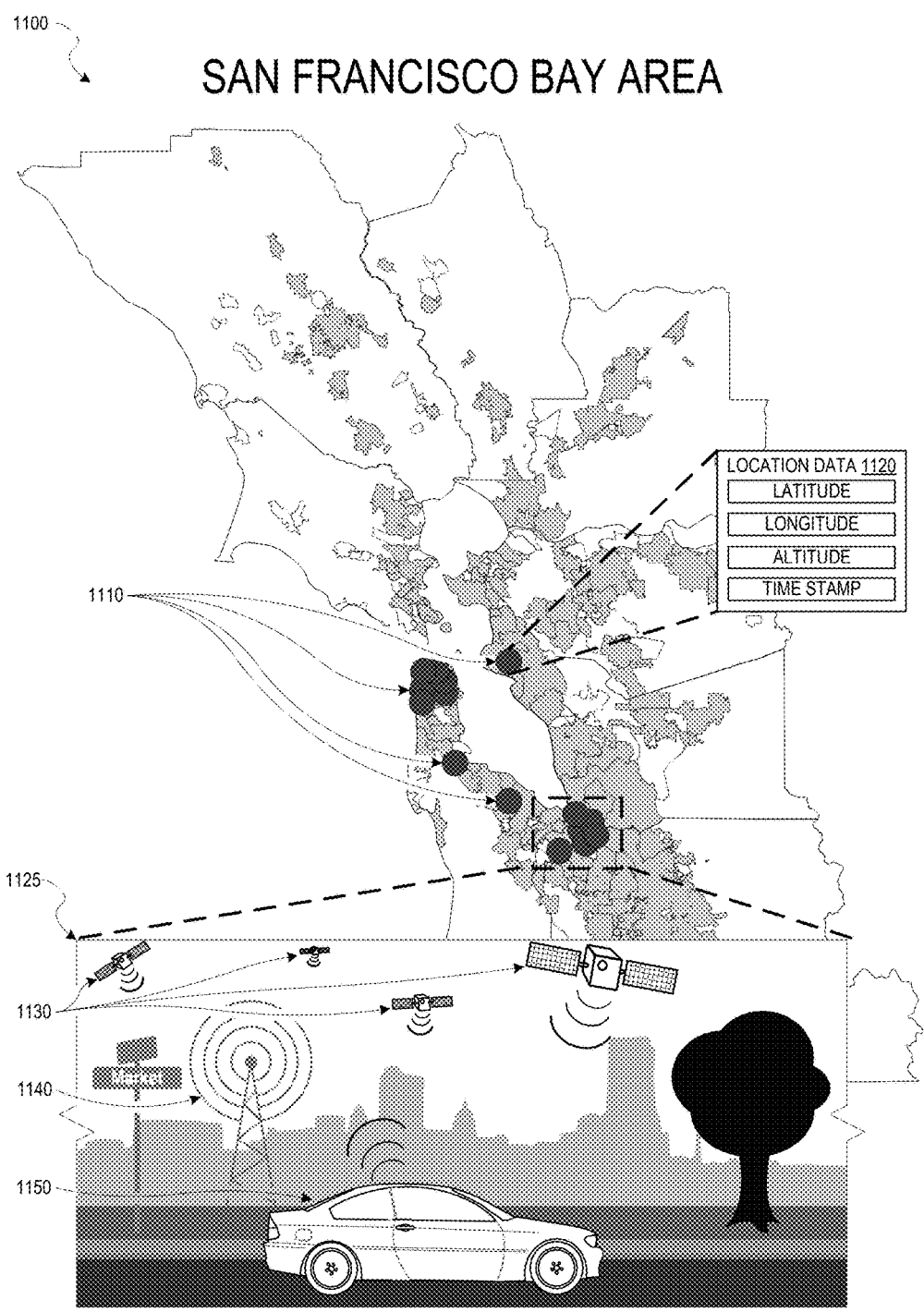
FIG. 11 is a pictorial diagram illustrating an example of determining a commerce output based on attribute data such as location data according to some example embodiments.

FIG. 11 illustrates an example of determining the commerce output based on the attribute data that may include location data according to some example embodiments. Map 1100 depicts example locations 1110 that may each correspond with portions of the attribute data, such as location data 1120, received from a particular user device. In an example embodiment, the location data 1120 may include latitude, longitude, altitude, time stamp, or other position data.

Callout view 1125 illustrates an example of how the location data 1120 may be determined by a user device 1150 (e.g., a mobile device of the user that includes a GPS component) and received by the attribute module 230, in various example embodiments. The user device 1150 may determine location using a GPS system. In such a system, satellites 1130 may broadcast a GPS signal detected by the user device 1150. The user device 1150 may derive the location data 1120 by triangulation of multiple GPS signals received from the satellites 1130. Once the user device 1150 has determined the location data 1120, the user device 1150 may communicate the location data 1120 to the attribute module 230 via, for example, a wireless network coupling that may employ a radio tower 1140.

In a specific example of determining the commerce output based on location data, the attribute module 230 may receive location data 1120 corresponding with many different locations associated with the user over a period of time. In this example, the characteristic module 240 may infer a particular user characteristic from the location data 1120 such as the user residing in San Jose and making frequent trips to San Francisco. The characteristic module 240 may employ a variety of techniques to determine salient locations (e.g., mean location over a time period) and analyze the location data 1120 in conjunction with other portions of the attribute data. The profile module 250 may subsequently identify consumer profiles based on the characteristic of being a commuter, for example. The profile module 250 may then determine second, third, and higher order characteristics based on the identified consumer profiles. For example, a particular second order characteristic may be use of public transportation and a particular third order characteristic may be living in a high cost of living area. The commerce module 260 may then identify a particular commerce output based on the second and third order characteristics. And finally, the presentation module 210 may the cause recommendation of the particular commerce output to the user (e.g., an advertisement).

Figure 12:
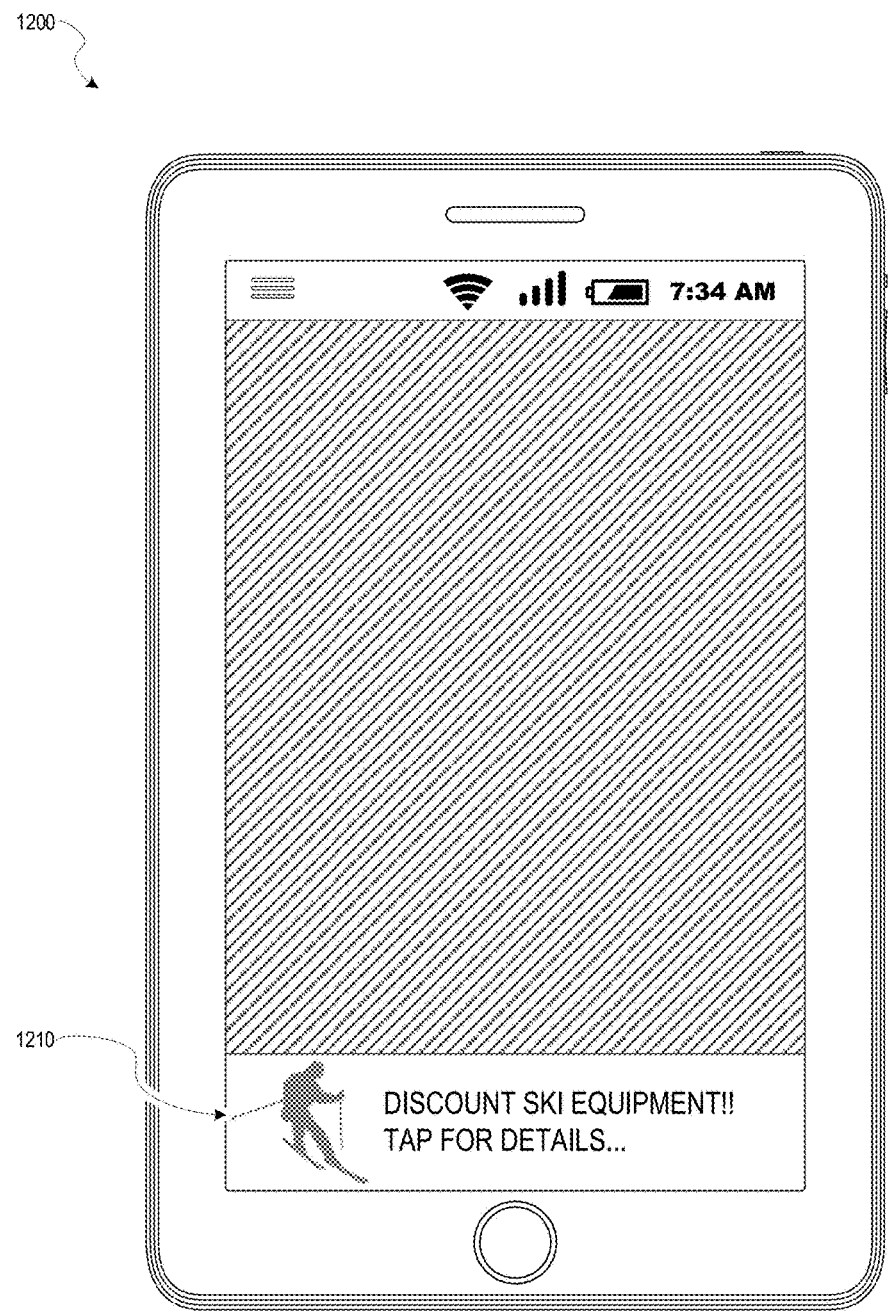
FIGS. 12, 13, and 14 are user interface diagrams depicting example recommendations of a commerce output according to some example embodiments.
Figure 13:
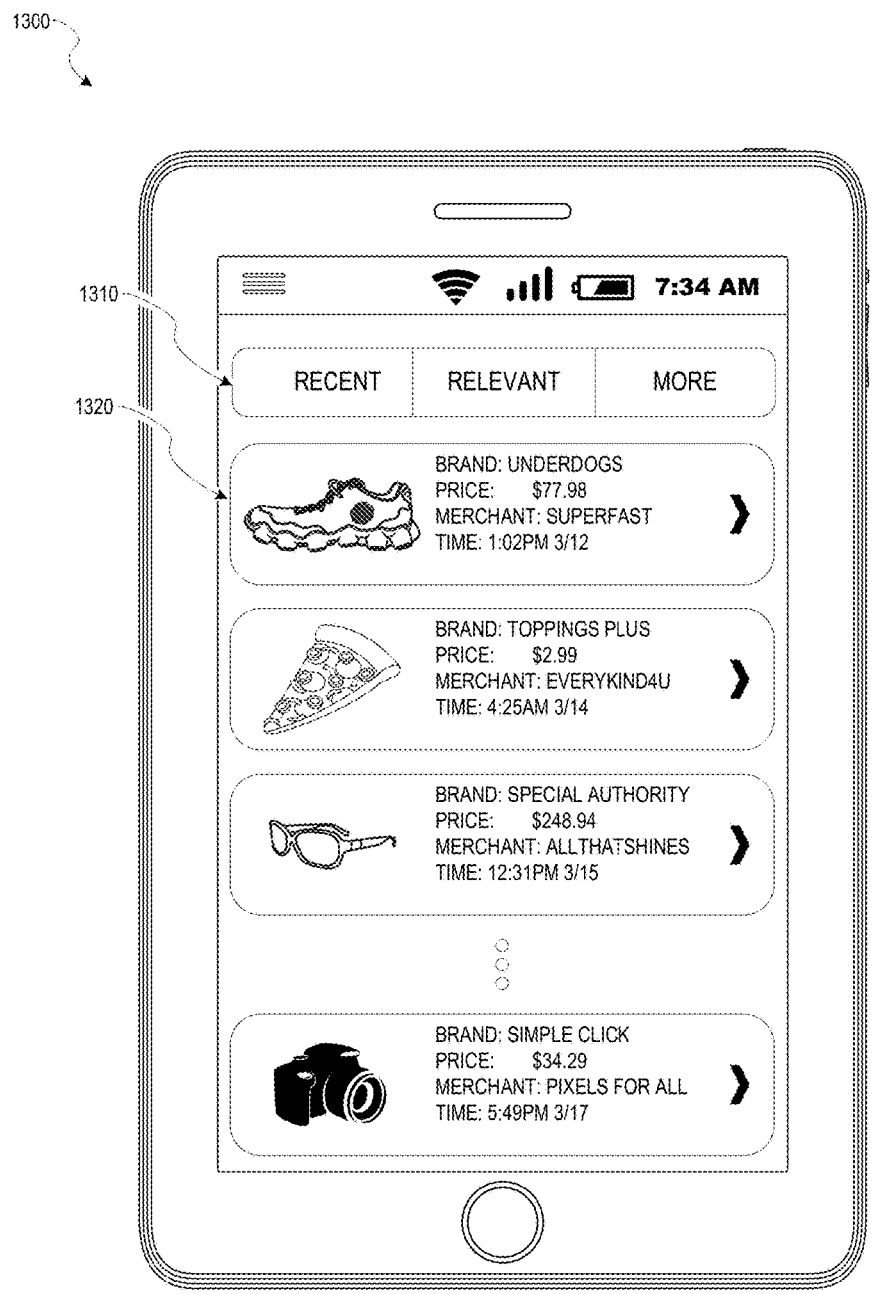
Figure 14:
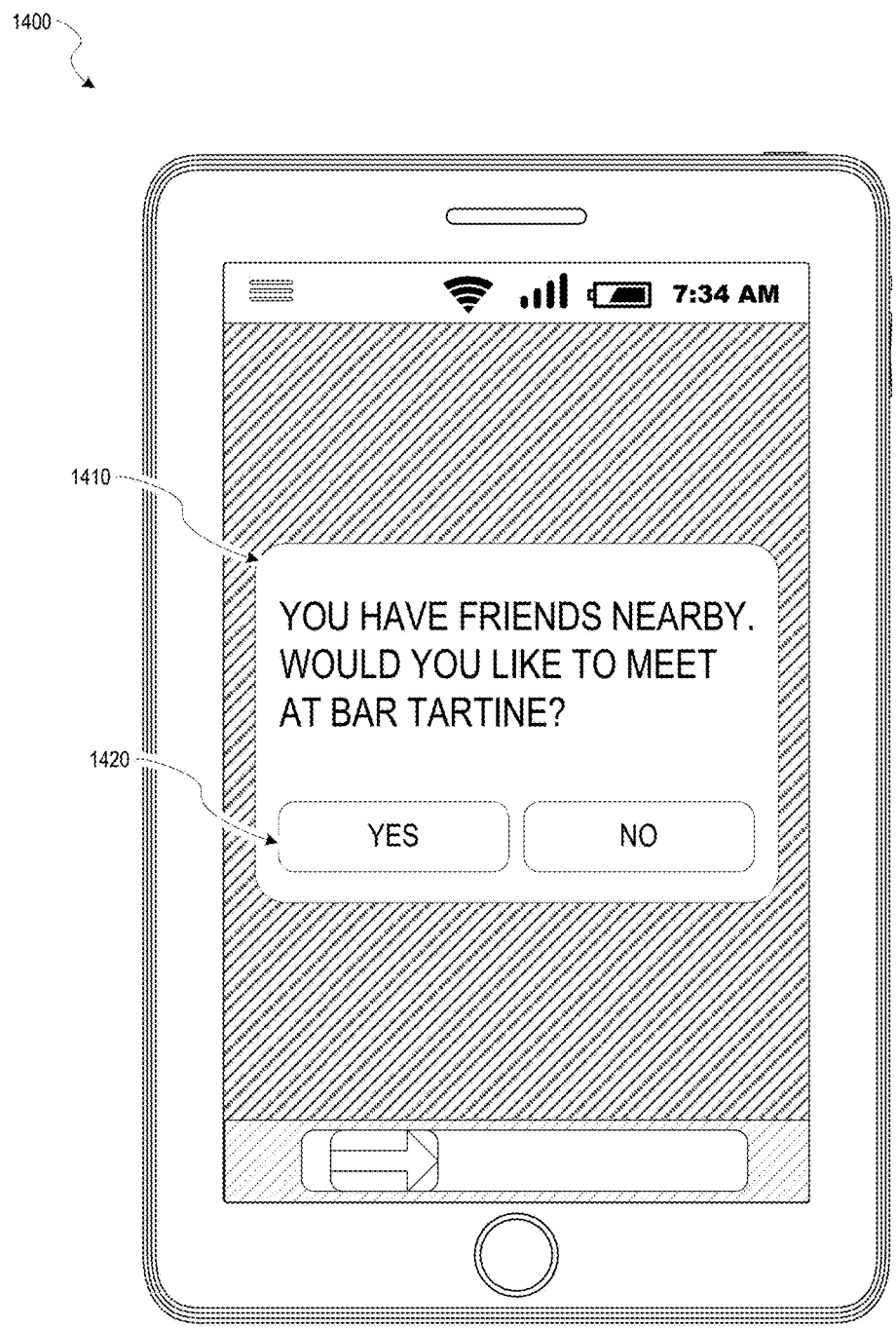

FIGS. 12, 13, and 14 depict example recommendations of the identified commerce output to the user, according to example embodiments. Although FIGS. 12, 13, and 14 depict specific example recommendations, these specific example recommendations are merely non-limiting examples and many other alternate recommendations of the identified commerce output may be employed by the presentation module 210. Recommending the commerce output, as used herein, is intended to include direct recommendations (e.g., an advertisement corresponding to the commerce output) and other forms of recommendation (e.g., sorting a list of products to emphasize or highlight the commerce output). It will be noted that alternate presentations of the displays of FIGS. 12, 13, and 14 may include additional information, graphics, options, and so forth; other presentations may include less information, or may provide abridged information for easy use by the user.

FIG. 12 depicts an example recommendation, according to example embodiments. In an example embodiment, the presentation module 210 may recommend the commerce output to the user. The recommendation may be in the example form of a mobile advertisement 1210 on a mobile device 1200 of the user. The mobile advertisement 1210 may be an interactive advertisement that, when activated by the user, may facilitate the user to purchase a product or service corresponding to the mobile advertisement 1210. Many alternate interactive presentations of the mobile advertisement 1210 may include additional information, graphics, media, options, and so on while other presentations may include less information.

FIG. 13 depicts an example recommendation in the example form of a product listing user interface interactively presented on a device 1300, according to example embodiments. The product listing user interface may include options to sort the product listings or otherwise navigate the product listing via a number of techniques. For instance, user interface element 1310, when activated by the user, may sort the product listings by recentness, relevance, or other metrics. The example product listing 1320 may include product information such as a product image, price, merchant, brand, and the like. In various example embodiments, the product information may be retrieved from the publication systems 120. The product listings may be associated with the identified commerce output or include the identified commerce output. Recommending the commerce output to the user may include sorting the product listings in such a way as to emphasize or highlight the identified commerce output. Many other schemes and techniques may be employed to recommend the commerce output to the user.

FIG. 14 depicts an example recommendation in the example form of a notification 1410 interactively presented on a device 1400, according to example embodiments. In some example embodiments, the notifications 1410 may be text messages, such as Short Message Service (SMS) messages, Multimedia Messaging Service (MMS), Enhanced Messaging Service (EMS), other messaging modalities, which may be provided to notify the user of a delivery, up-coming event or other information. In other example embodiments, the notification 1410 may be a push notification or similar type of notification. Some text messages may be interactive, enabling the user to make a selection through the SMS system, mobile application, or other method. For instance, the user may interact with the notification 1410 using user interface element 1420.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Applications

Figure 15:
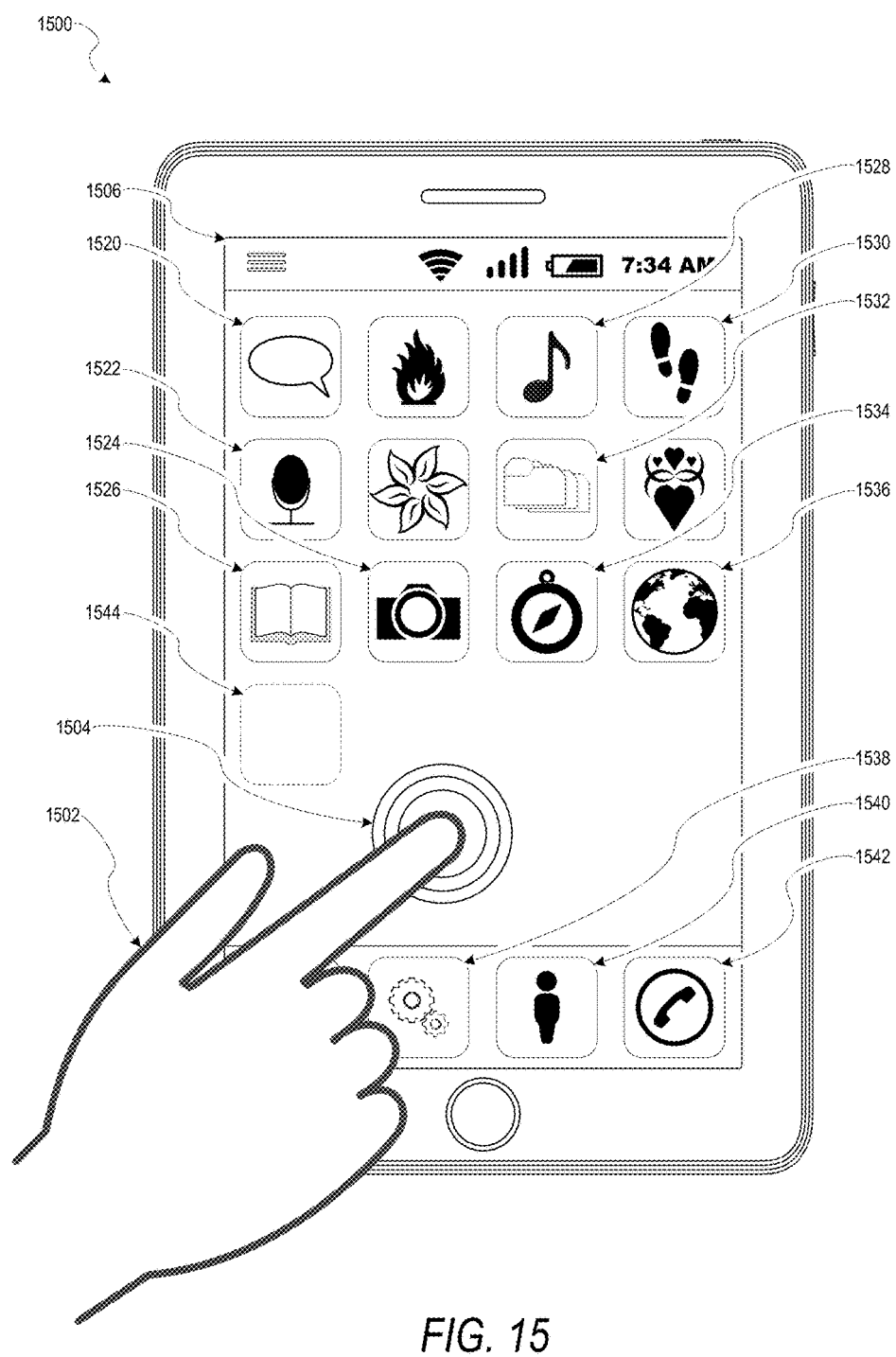
FIG. 15 is a user interface diagram depicting an example mobile device and mobile operating system interface, according to some example embodiments.

FIG. 15 illustrates an example mobile device 1500 executing a mobile operating system (e.g., iOS™, Android™, Windows® Phone, or other mobile operating systems), according to example embodiments. In one embodiment, the mobile device 1500 includes a touch screen that receives tactile data from a user 1502. For instance, the user 1502 physically touch 1504 the mobile device 1500, and in response to the touch 1504, the mobile device 1500 determines tactile data such as touch location, touch force, gesture motion, and so forth. In various example embodiments, the mobile device 1500 displays a home screen 1506 (e.g., Springboard on iOS™) operable to launch applications or otherwise manage various aspects of the mobile device 1500. In some example embodiments, the home screen 1506 provides status information such as battery life, connectivity, or other hardware statuses. In some implementations, the user 1502 activates user interface elements by touching an area occupied by a respective user interface element. In this manner, the user 1502 may interact with the applications. For example, touching the area occupied by a particular icon included in the home screen 1506 causes launching of an application corresponding to the particular icon.

Many varieties of applications (also referred to as "apps") may be executing on the mobile device 1500 such as native applications (e.g., applications programmed in Objective-C running on IOS™ or applications programmed in Java running on ANDROID™), mobile web applications (e.g., Hyper Text Markup Language-5 (HTML5)), or hybrid applications (e.g., a native shell application that launches an HTML5 session). In a specific example, the mobile device 1500 includes a messaging app 1520, audio recording app 1522, a camera app 1524, a book reader app 1526, a media app 1528, a fitness app 1530, a file management app 1532, a location app 1534, a browser app 1536, a settings app 1538, a contacts app 1540, a telephone call app 1542, other apps (e.g., gaming apps, social networking apps, biometric monitoring apps), a third party app 1544, and so forth.

Software Architecture

Figure 16:
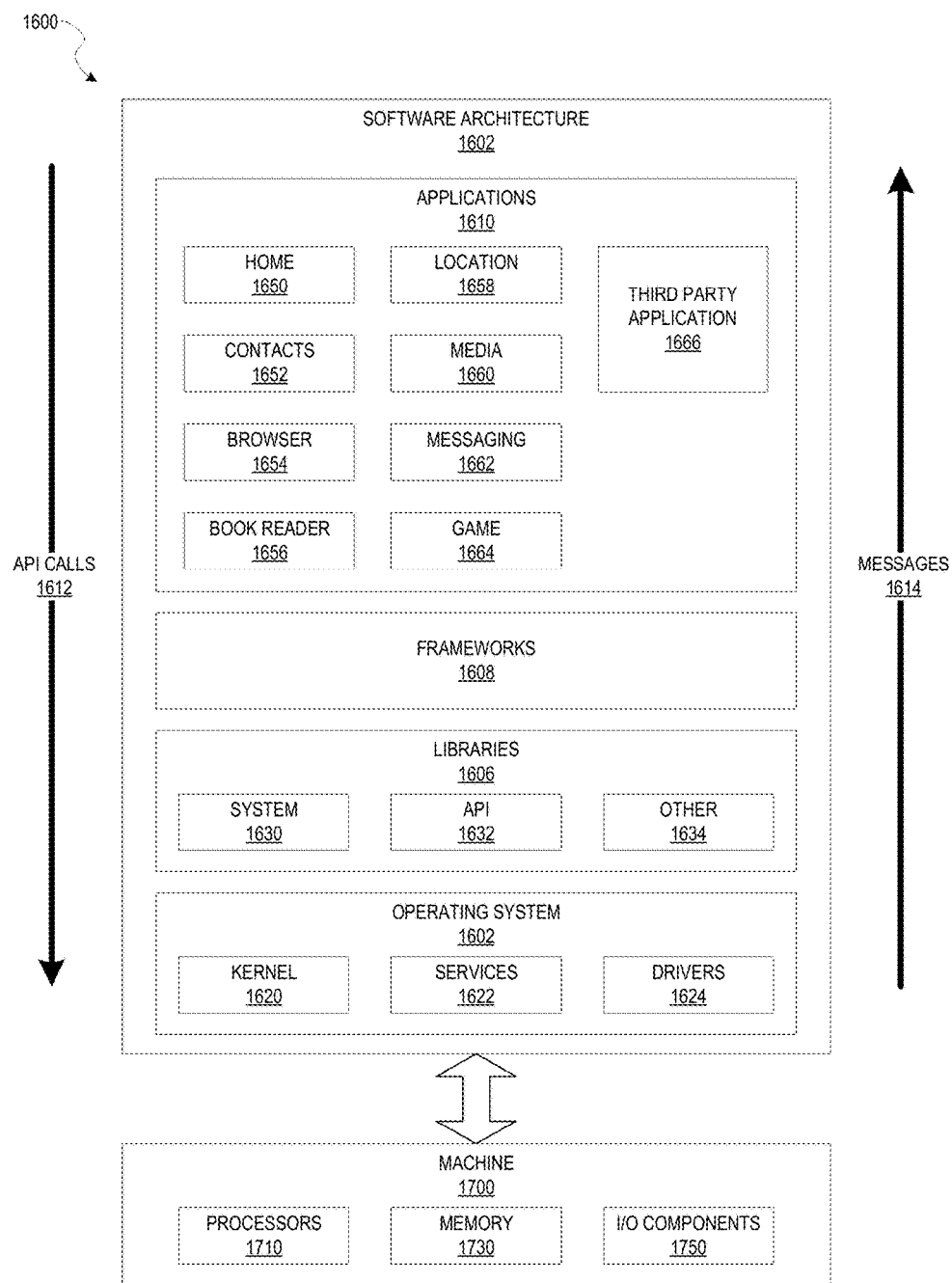
FIG. 16 is a block diagram illustrating an example of a software architecture that may be installed on a machine according to some example embodiments.

FIG. 16 is a block diagram 1600 illustrating an architecture of software 1602, which may be installed on any one or more of devices described above. FIG. 16 is merely a non-limiting example of a software architecture, and it will be appreciated that many other architectures may be implemented to facilitate the functionality described herein. The software 1602 may be implemented by hardware such as machine 1700 of FIG. 17 that includes processors 1710, memory 1730, and I/O components 1750. In this example architecture, the software 1602 may be conceptualized as a stack of layers where each layer may provide a particular functionality. For example, the software 1602 includes layers such as an operating system 1604, libraries 1606, frameworks 1608, and applications 1610. Operationally, the applications 1610 invoke application programming interface (API) calls 1612 through the software stack and receive messages 1614 in response to the API calls 1612, according to some implementations.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers in some implementations. For example, the kernel 1620 provides memory management, processor management (e.g., scheduling), component management, networking, security settings, among other functionality. The services 1622 may provide other common services for the other software layers. The drivers 1624 may be responsible for controlling or interfacing with the underlying hardware. For instance, the drivers 1624 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1606 provide a low-level common infrastructure that may be utilized by the applications 1610. The libraries 1606 may include system 1630 libraries (e.g., C standard library) that may provide functions such as memory allocation functions, string manipulation functions, mathematic functions, and the like. In addition, the libraries 1606 may include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1606 may also include a wide variety of other libraries 1634 to provide many other APIs to the applications 1610.

The frameworks 1608 provide a high-level common infrastructure that may be utilized by the applications 1610, according to some implementations. For example, the frameworks 1608 provide various graphic user interface (GUI) functions, high-level resource management, high-level location services, and so forth. The frameworks 1608 may provide a broad spectrum of other APIs that may be utilized by the applications 1610, some of which may be specific to a particular operating system or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications such as third party application 1666. In a specific example, the third party application 1666 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1666 may invoke the API calls 1612 provided by the mobile operating system 1604 to facilitate functionality described herein.

Example Machine Architecture and Machine-Readable Medium

Figure 17:
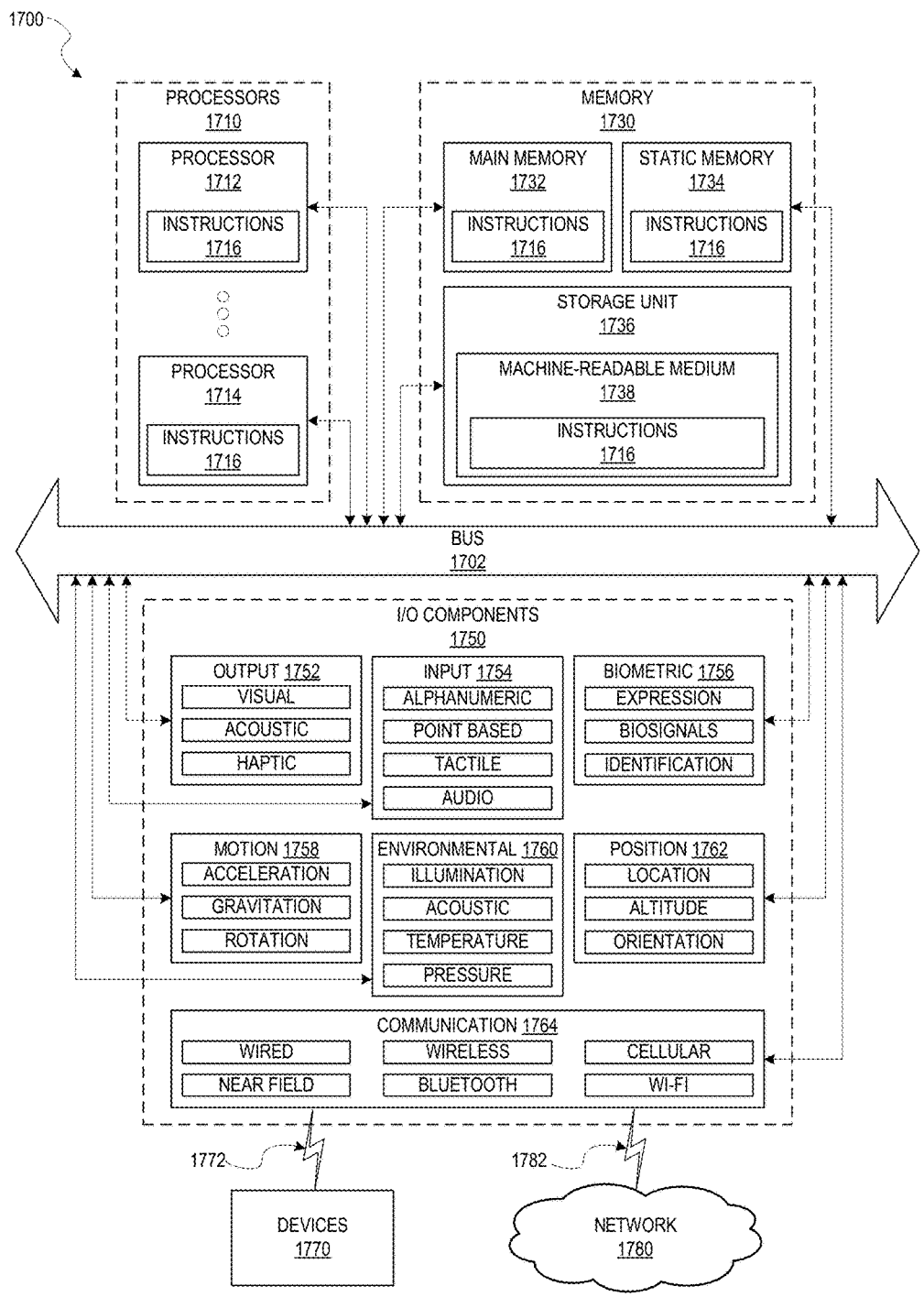
FIG. 17 is a block diagram presenting a diagrammatic representation of a machine in the form of a computer system within which a set of instructions may be executed for causing the machine to perform any one or more of the methodologies discussed herein according to an example embodiment.

FIG. 17 is a block diagram illustrating components of a machine 1700, according to some example embodiments, able to read instructions from a machine-readable medium (e.g., a machine-readable storage medium) and perform any one or more of the methodologies discussed herein. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other via a bus 1702. In an example embodiment, the processors 1710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1712 and processor 1714 that may execute instructions 1716. The term "processor" is intended to include multi-core processors that may comprise two or more independent processors (also referred to as "cores") that may execute instructions contemporaneously. Although FIG. 17 shows multiple processors, the machine 1700 may include a single processor with a single core, a single processor with multiple cores (e.g., a multi-core process), multiple processors with a single core, multiple processors with multiples cores, or any combination thereof.

The memory 1730 may include a main memory 1732, a static memory 1734, and a storage unit 1736 accessible to the processors 1710 via the bus 1702. The storage unit 1736 may include a machine-readable medium 1738 on which is stored the instructions 1716 embodying any one or more of the methodologies or functions described herein. The instructions 1716 may also reside, completely or at least partially, within the main memory 1732, within the static memory 1734, within at least one of the processors 1710 (e.g., within the processor's cache memory), or any suitable combination thereof, during execution thereof by the machine 1700. Accordingly, in various implementations, the main memory 1732, static memory 1734, and the processors 1710 are considered as machine-readable media 1738.

As used herein, the term "memory" refers to a machine-readable medium 1738 able to store data temporarily or permanently and may be taken to include, but not be limited to, random-access memory (RAM), read-only memory (ROM), buffer memory, flash memory, and cache memory. While the machine-readable medium 1738 is shown in an example embodiment to be a single medium, the term "machine-readable medium" should be taken to include a single medium or multiple media (e.g., a centralized or distributed database, or associated caches and servers) able to store instructions 1716. The term "machine-readable medium" shall also be taken to include any medium, or combination of multiple media, that is capable of storing instructions (e.g., instructions 1716) for execution by a machine (e.g., machine 1700), such that the instructions, when executed by one or more processors of the machine 1700 (e.g., processors 1710), cause the machine 1700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1750 include a wide variety of components to receive input, provide output, produce output, transmit information, exchange information, capture measurements, and so on. It will be appreciated that the I/O components 1750 may include many other components that are not shown in FIG. 17. The I/O components 1750 are grouped according to functionality merely for simplifying the following discussion and the grouping is in no way limiting. In various example embodiments, the I/O components 1750 include output components 1752 and input components 1754. The output components 1752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1754 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 1750 include biometric components 1756, motion components 1758, environmental components 1760, or position components 1762 among a wide array of other components. For example, the biometric components 1756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1758 include acceleration sensor components (e.g., accelerometer), gravitation sensor components, rotation sensor components (e.g., gyroscope), and so forth. The environmental components 1760 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 1762 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via coupling 1782 and coupling 1772, respectively. For example, the communication components 1764 include a network interface component or another suitable device to interface with the network 1780. In further examples, communication components 1764 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., a peripheral device coupled via a Universal Serial Bus (USB)).

Moreover, in some implementations, the communication components 1764 detect identifiers or include components operable to detect identifiers. For example, the communication components 1764 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), acoustic detection components (e.g., microphones to identify tagged audio signals), or any suitable combination thereof. In addition, a variety of information can be derived via the communication components 1764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network and the coupling 1782 may be a Code Division Multiple Access (CDMA) connection, a Global System for Mobile communications (GSM) connection, or other type of cellular or wireless coupling. In this example, the coupling 1782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 1716 are transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, in other example embodiments, the instructions 1716 are transmitted or received using a transmission medium via the coupling 1772 (e.g., a peer-to-peer coupling) to devices 1770. The term "transmission medium" shall be taken to include any intangible medium that is capable of storing, encoding, or carrying instructions 1716 for execution by the machine 1700, and includes digital or analog communications signals or other intangible medium to facilitate communication of such software.

Furthermore, the machine-readable medium 1738 is non-transitory (in other words, not having any transitory signals) in that it does not embody a propagating signal. However, labeling the machine-readable medium 1738 as "non-transitory" should not be construed to mean that the medium is incapable of movement; the medium should be considered as being transportable from one physical location to another. Additionally, since the machine-readable medium 1738 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more processors of a machine;
   a computer readable medium storing instructions, which when executed by the one or more processors of the machine, cause the machine to perform operations comprising:
   aggregating biometric data extracted from one or more biometric sensors of one or more computing devices, the biometric data corresponding to a user of the one or more computing devices;

storing, in a database, the biometric data as part of attribute data associated with the user, the storing of the plurality of biometric data comprising:
standardizing the biometric data to produce at least a portion of the attribute data, the standardizing of the biometric data comprising modifying the biometric data into a standard form to facilitate analysis of the plurality of biometric datasets by the machine, and
indexing the biometric data based on a user identifier of the user;
retrieving, using the user identifier, the attribute data associated with the user;
determining a device type of at least one of the one or more computing devices based on information obtained from the at least one of the one or more computing devices over a communication network;
inferring a characteristic of the user based on a combination of an identified pattern in the biometric data, and the device type of the at least one of the one or more computing devices, the inferring of the characteristic of the user including applying a weighting factor to a particular portion of the biometric data;
correlating the characteristic of the user with one or more consumer characteristics of a consumer profile;
identifying output information based on a predefined association of the consumer profile with the output information;
transmitting, to at least one of the one or more computing devices, a notification that includes the output information; the notification further including one or more interactive elements that enable the user to interact with the notification;
utilizing a machine-learning algorithm to analyze the inferred user characteristic of the user to detect an incorrect inference; and
adjusting the weighting factor applied to the particular portion of the biometric data based on detecting the incorrect inference.

2. The system of claim 1, the biometric data includes at least one of: a biosignal measurement corresponding to at least one of a blood pressure, a heart rate, body temperature, perspiration, or brain waves.

3. The system of claim 1, wherein the one or more biometric sensors include at least one of a blood pressure sensor, a heart rate sensor, a body temperature sensor, a perspiration sensor, or a brain wave sensor.

4. The system of claim 1, wherein the inferring of the characteristic of the user further includes identifying the pattern in the biometric data based on a combination of consistency and timing of data points in the biometric data.

5. The system of claim 1, wherein the identified pattern in the biometric data includes a usage pattern of at least one of the one or more computing devices.

6. The system of claim 1, wherein:
the characteristic is a first characteristic; and
the operations further comprise inferring a second characteristic included in a list of predefined characteristics.

7. The system of claim 1, wherein:
the portion of the biometric data is a first portion of the biometric;
the weighting factor is a first weighting factor;
the operations further comprise:
determining a second weighting factor for a second portion of the biometric data; and
applying the second weighting factor to the second portion of the biometric data,
wherein the inferring of the characteristic is further based on the second weighting factor applied to the second portion of the biometric data.

8. The system of claim 7, wherein the operations further comprise:
receiving an indication of a result of the transmitting of the notification to the at least one of the one or more computing devices, the result including an action performed by the user; and
adjusting at least one of the first or second weighting factor based on the indication of the result.

9. The system of claim 1, wherein the operations further comprise:
identifying second order characteristics based on the consumer profile;
ranking the second order characteristics based on a relevance metric associated with each of the second order characteristics, each relevance metric indicating a relevance of a corresponding second order characteristic to the user; and
identifying the output information based, at least in part, on the ranked second order characteristics.

10. The system of claim 9, wherein the operations further comprise:
identifying a complementary consumer profile by correlating the consumer profile with at least one other consumer profile;
determining third order characteristics based on the complementary consumer profile; and
identifying the output information based, at least in part, on the third order characteristics.

11. The system of claim 10, wherein the operations further comprise:
filtering the third order characteristics based on the attribute data; and
identifying the output information based on the filtered third order characteristics.

12. A method comprising:
aggregating biometric data extracted from one or more biometric sensors of one or more computing devices, the biometric data corresponding to a user of the one or more computing devices;
storing, in a database, the biometric data as part of attribute data associated with the user, the storing of the plurality of biometric data comprising:
standardizing the biometric data to produce at least a portion of the attribute data, the standardizing of the biometric data comprising modifying the biometric data into a standard form to facilitate analysis of the plurality of biometric datasets by the machine, and
indexing the biometric data based on a user identifier of the user;
retrieving, using the user identifier, the attribute data associated with the user;
determining a device type of at least one of the one or more computing devices based on information obtained from the at least one of the one or more computing devices over a communication network;
inferring, using one or more processors, a characteristic of the user based on a combination of an identified pattern in the biometric data, and the device type of the at least one of the one or more computing devices, the inferring of the characteristic of the user including applying a weighting factor to a particular portion of the biometric data;
correlating the characteristic of the user with one or more consumer characteristics of a consumer profile;

identifying output information based on a predefined association of the consumer profile with the output information;

transmitting, to at least one of the one or more computing devices, a notification that includes the output information, the notification further including one or more interactive elements that enable the user to interact with the notification;

utilizing a machine-learning algorithm to analyze the inferred user characteristic of the user to detect an incorrect inference; and adjusting the weighting factor applied to the particular portion of the biometric data based on detecting the incorrect inference.

13. The method of claim 12, wherein the biometric data includes a continuous biometric data feed extracted in real-time.

14. The method of claim 12, wherein the one or more biometric sensors include at least one of a blood pressure sensor, a heart rate sensor, a body temperature sensor, a perspiration sensor, or a brain wave sensor.

15. The method of claim 12, wherein the inferring of the characteristic of the user includes identifying the pattern in the biometric data based on a combination of consistency and timing of data points in the biometric data.

16. The method of claim 12, wherein the identified pattern in the biometric data includes a usage pattern of at least one of the one or more computing devices.

17. The method of claim 12, wherein the transmitting of the notification includes transmitting at least one of a Short Message Service (SMS) message, a Multimedia Message Service (MMS) message, an Enhanced Messaging Service (EMS) message, or a push notification.

18. The method of claim 12, further comprising:

the portion of the biometric data is a first portion of the biometric;

the weighting factor is a first weighting factor;

the operations further comprise:

determining a second weighting factor for a second portion of the biometric data; and applying the second weighting factor to the second portion of the biometric data, wherein the determining of the characteristic is further based on the second weighting factor applied to the second portion of the biometric data.

19. The method of claim 18, further comprising:

receiving an indication of a result of the transmitting of the notification to the at least one of the one or more computing devices, the result including an action performed by the user; and adjusting at least one of the first or second weighting factor based on the indication of the result.

20. A non-transitory machine readable medium storing instructions that, when executed by at least one processor of a machine, cause the machine to perform operations comprising:

aggregating biometric data extracted from one or more biometric sensors of one or more computing devices, the biometric data corresponding to a user of the one or more computing devices;

storing, in a database, the biometric data as part of attribute data associated with the user, the storing of the plurality of biometric data comprising:

standardizing the biometric data to produce at least a portion of the attribute data, the standardizing of the biometric data comprising modifying the biometric data into a standard form to facilitate analysis of the plurality of biometric datasets by the machine, and indexing the biometric data based on a user identifier of the user;

retrieving, using the user identifier, the attribute data associated with the user;

determining a device type of at least one of the one or more computing devices based on information obtained from the at least one of the one or more computing devices over a communication network;

inferring a characteristic of the user based on a combination of an identified pattern in the biometric data, and the device type of the computing device, the inferring of the characteristic of the user including applying a weighting factor to a particular portion of the biometric data;

correlating the characteristic of the user with one or more consumer characteristics of a consumer profile;

identifying output information based on a predefined association of the consumer profile with the output information;

transmitting, to at least one of the one or more computing devices, a notification that includes the output information, the notification further including one or more interactive elements that enable the user to interact with the notification;

utilizing a machine-learning algorithm to analyze the inferred user characteristics of the user to detect an incorrect inference; and adjusting the weighting factor applied to the particular portion of the biometric data based on detecting the incorrect inference.

\* \* \* \* \*